United States Patent [19]

Shorey

[11] 4,235,399
[45] Nov. 25, 1980

[54] CARGO RAMP

[75] Inventor: Thomas H. Shorey, Freeland, Wash.

[73] Assignee: The Boeing Company, Seattle, Wash.

[21] Appl. No.: 28,334

[22] Filed: Apr. 9, 1979

[51] Int. Cl.³ .............................................. B64D 9/00
[52] U.S. Cl. .............................. 244/137 R; 14/71.1;
14/72.5; 193/38; 244/118.3; 244/129.5;
414/137; 414/480; 414/537
[58] Field of Search ............. 244/137 R, 129.5, 118.3;
414/480, 137, 139, 537, 538; 105/431, 436, 438,
447, 449; 114/72; 193/38; 14/71.1, 71.7, 72.5;
182/82, 86, 97

[56] References Cited
U.S. PATENT DOCUMENTS

| 3,799,479 | 3/1974 | Roeder et al. | 244/137 R |
| 4,039,163 | 8/1977 | Shorey | 244/137 R |

Primary Examiner—Barry L. Kelmachter
Attorney, Agent, or Firm—Christensen, O'Connor, Johnson & Kindness

[57] ABSTRACT

A cargo ramp configured for stowage on a cargo carrying vessel and deployment between a cargo opening or the outer boundary of a cargo deck and the surface of a cargo handling region such as a runway, dock or pier. The cargo ramp includes two hinged together ramp sections having a motor-driven wheel assembly at the lower terminus of the ramp and a vessel-to-ramp interface at the upper terminus of the ramp. Deployment and retrieval of the cargo ramp is effected through predetermined sequential operation of motor-driven deployment wheels located beneath the upper ramp section, actuators for operation of the hinge and the motor-driven wheel assembly at the lower terminus of the ramp. A power operated deployment mechanism contained in the ramp-to-vessel interface permits vertical adjustment of the upper terminus of the ramp when required. The ramp-to-vessel interface and the wheel assemblies at the lower terminus of the ramp are configured to permit various deflections and movement that can occur during deployment, retrieval and use of the cargo ramp.

31 Claims, 23 Drawing Figures

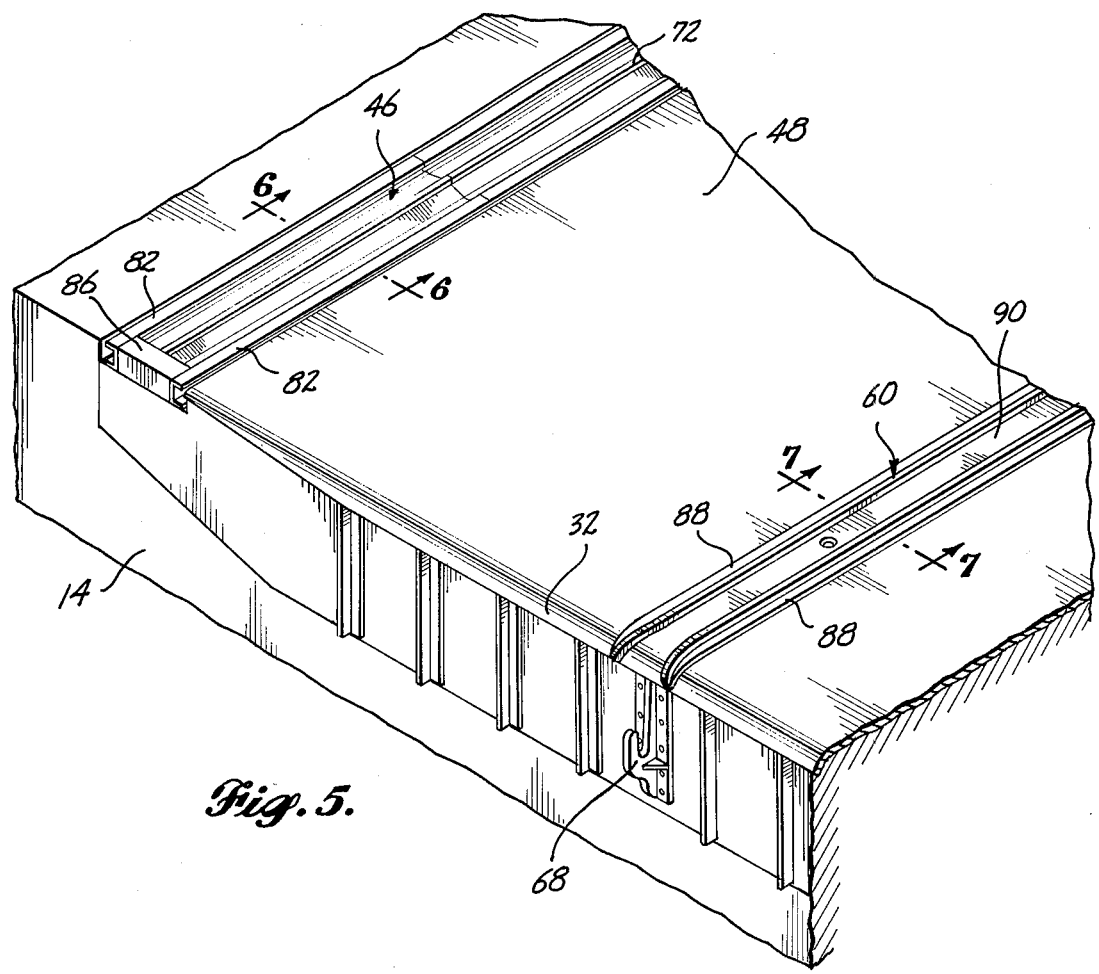
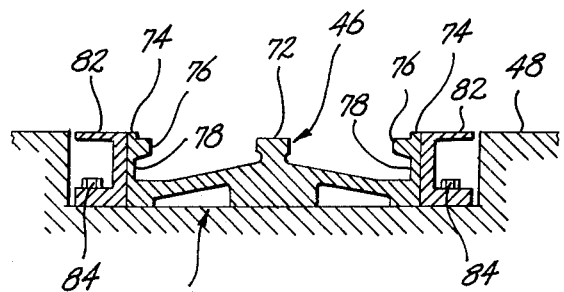
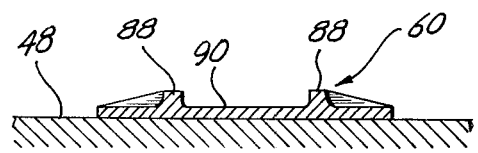

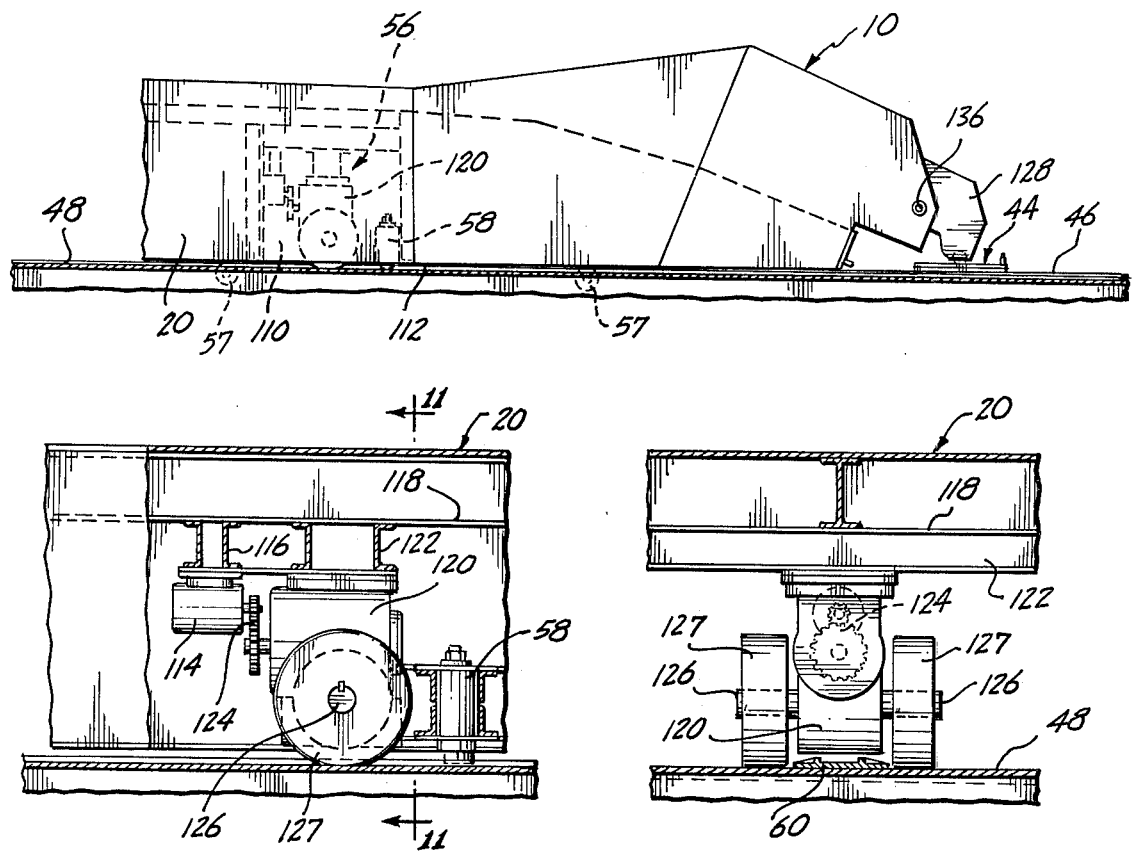
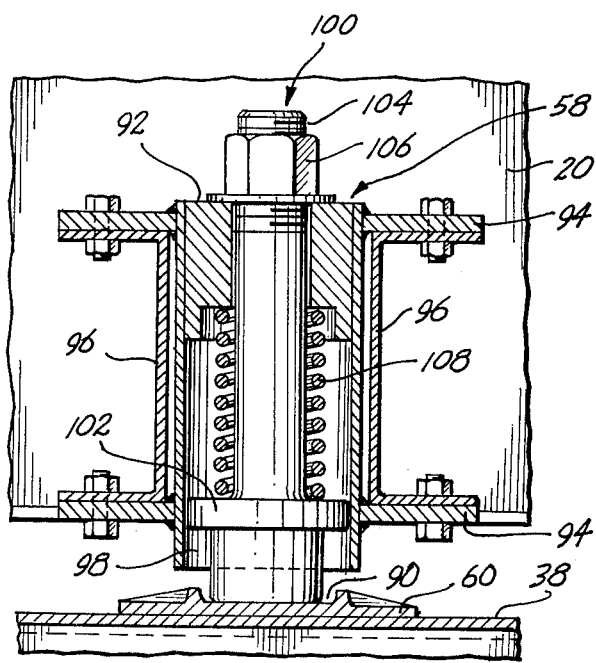

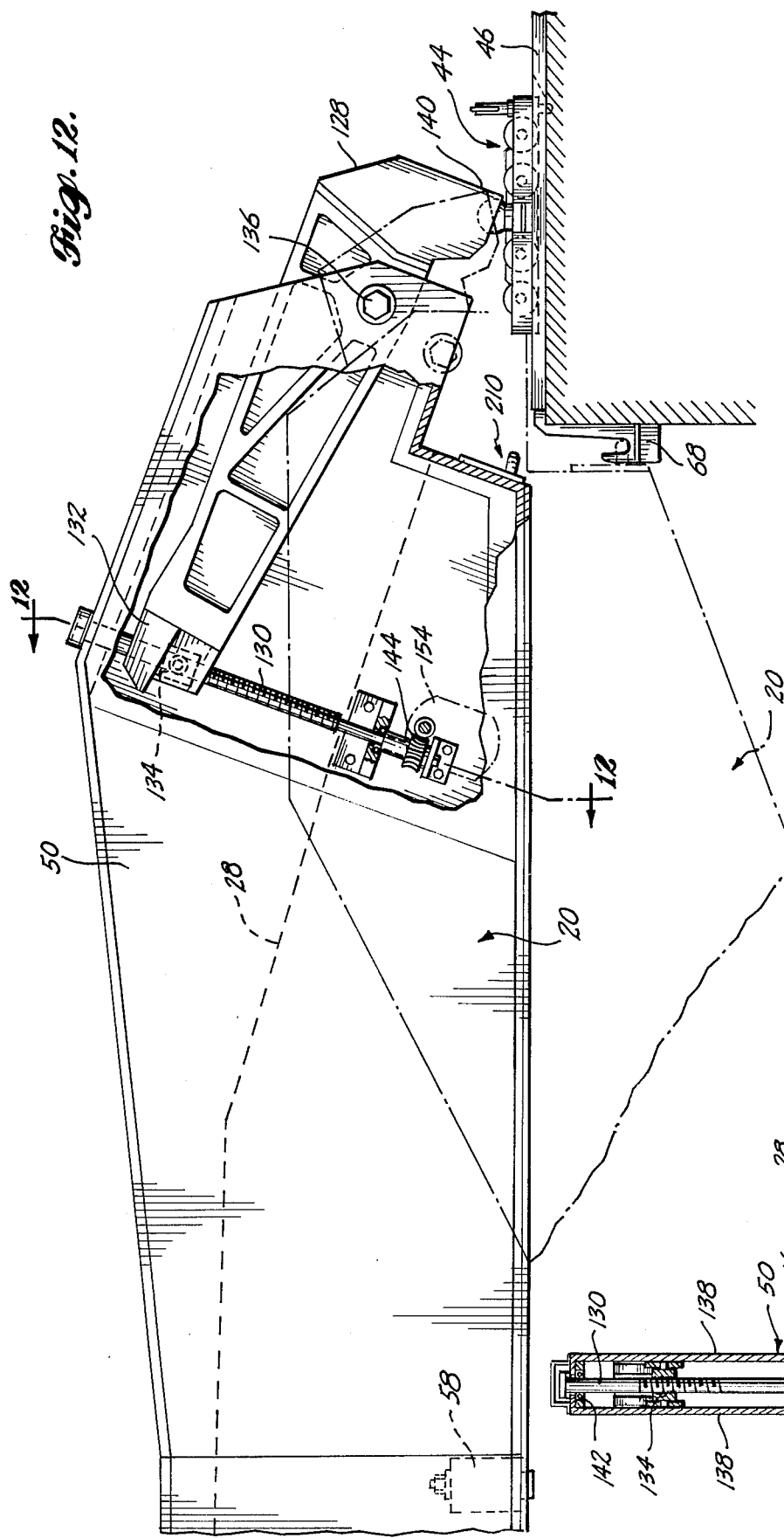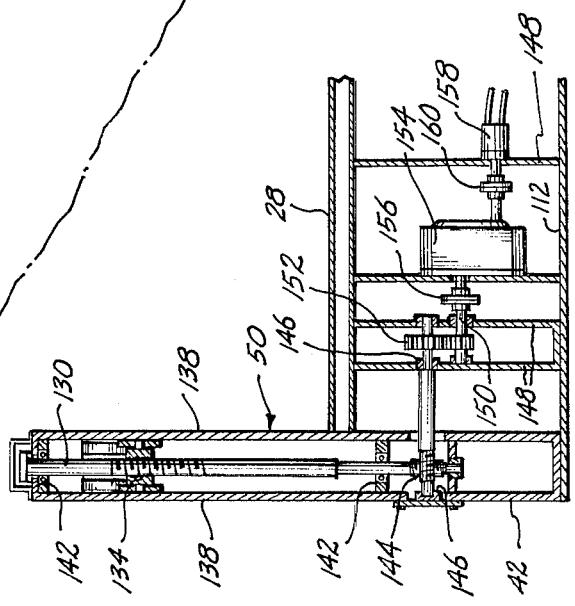

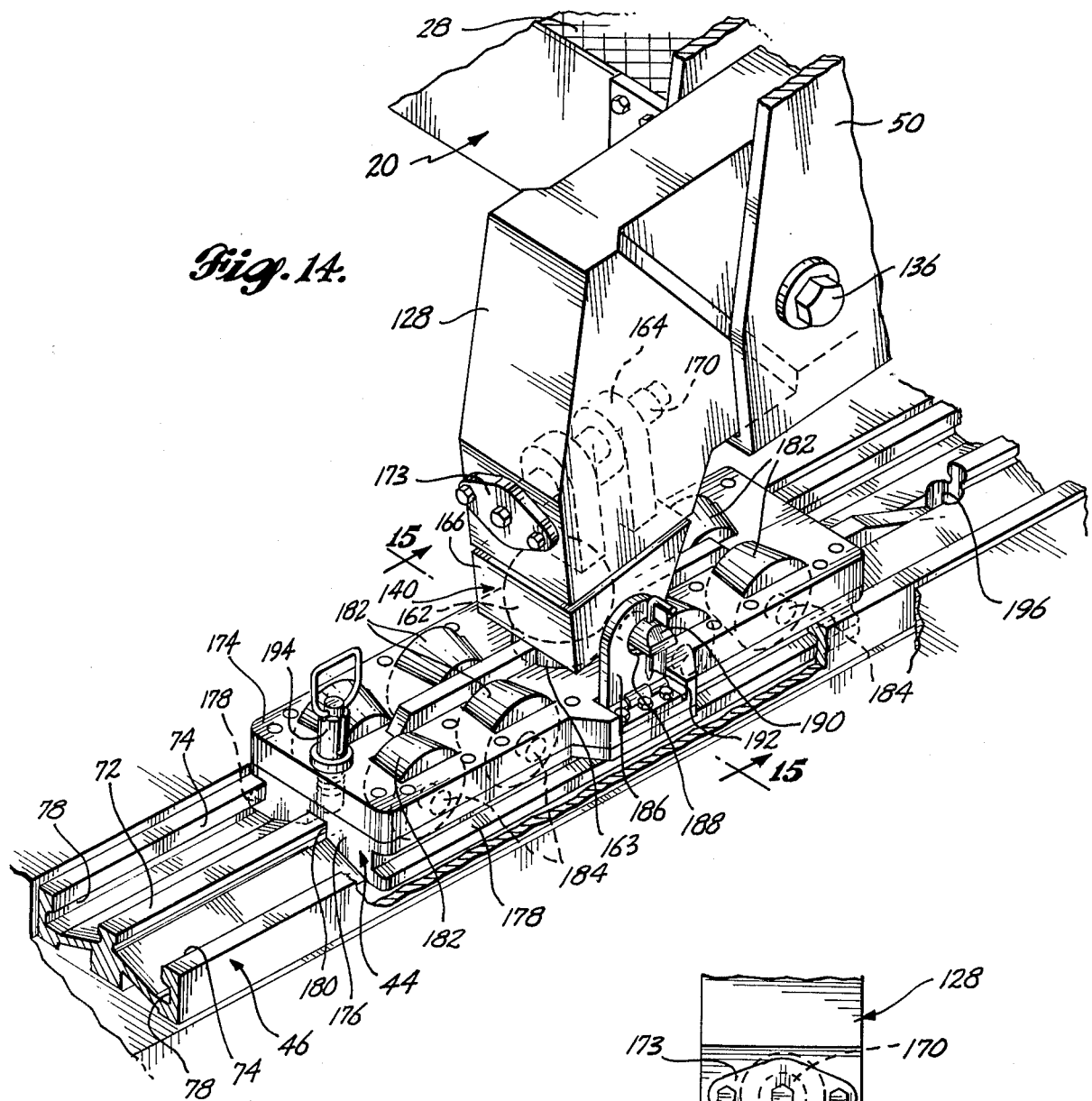
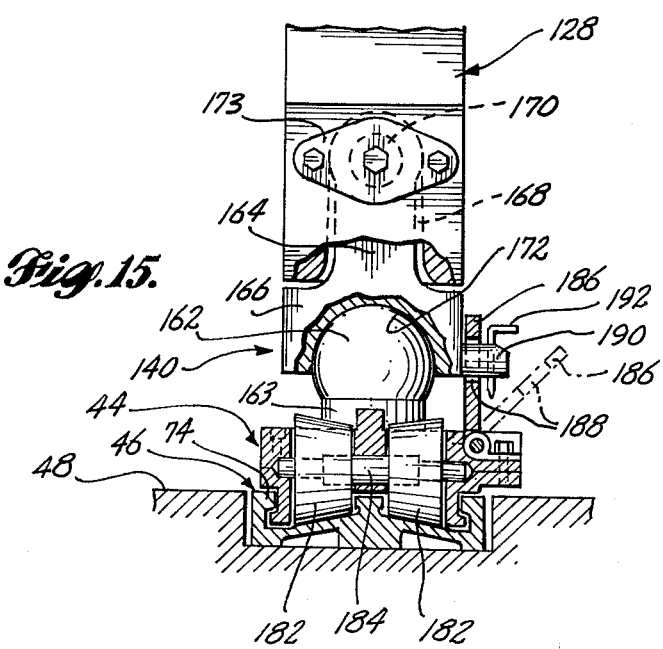

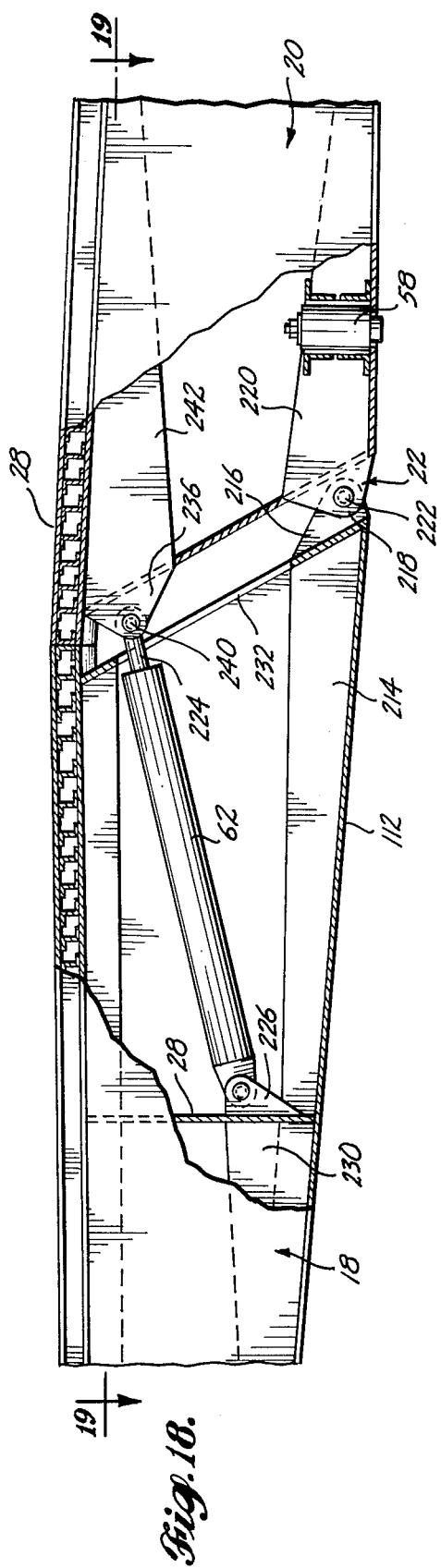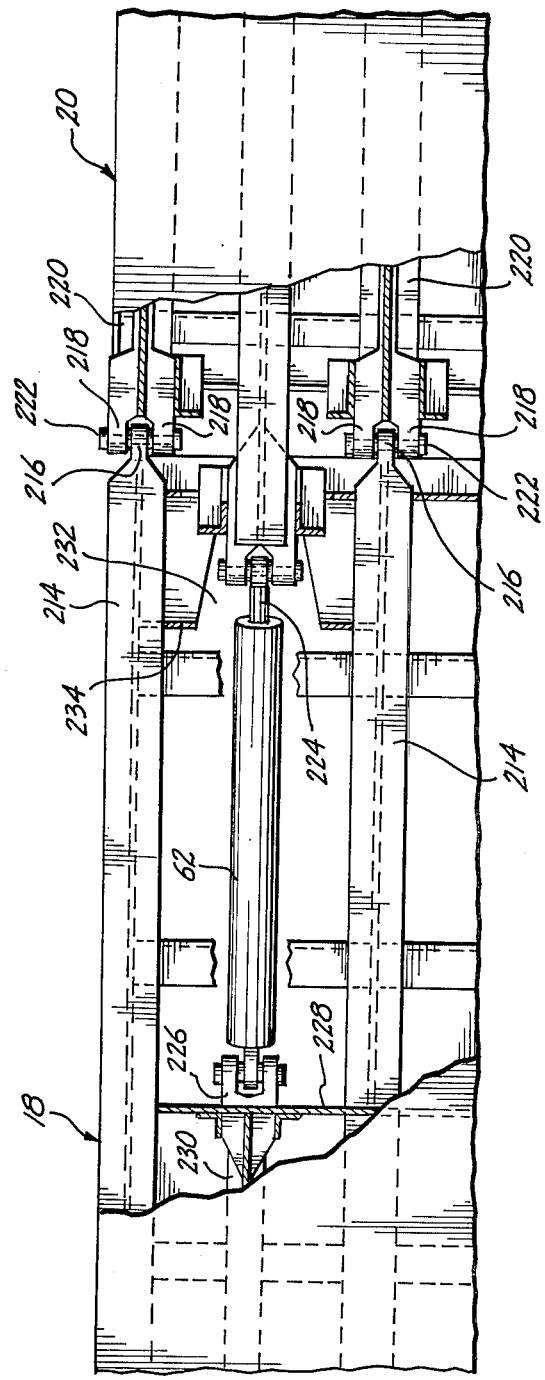

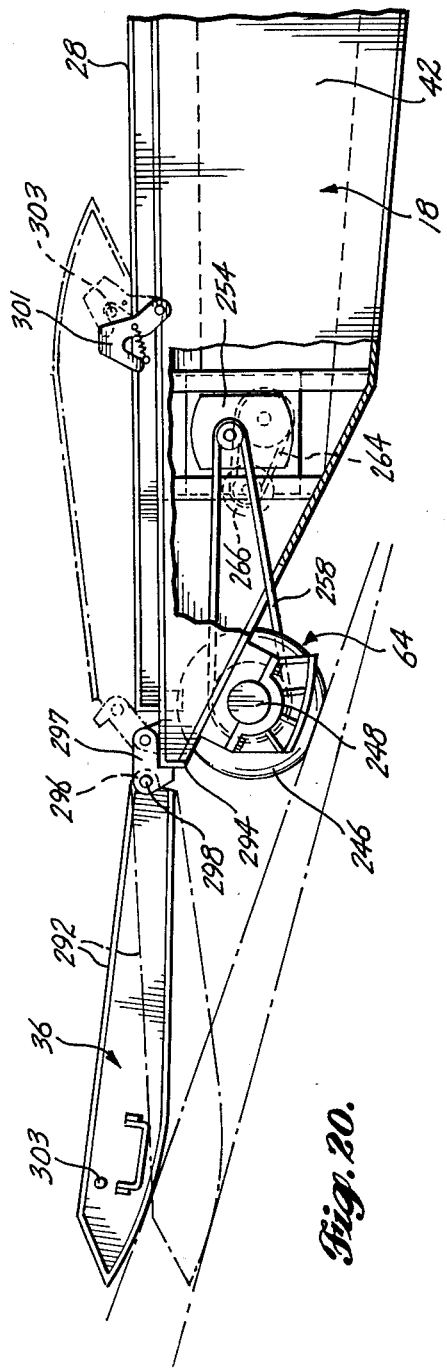
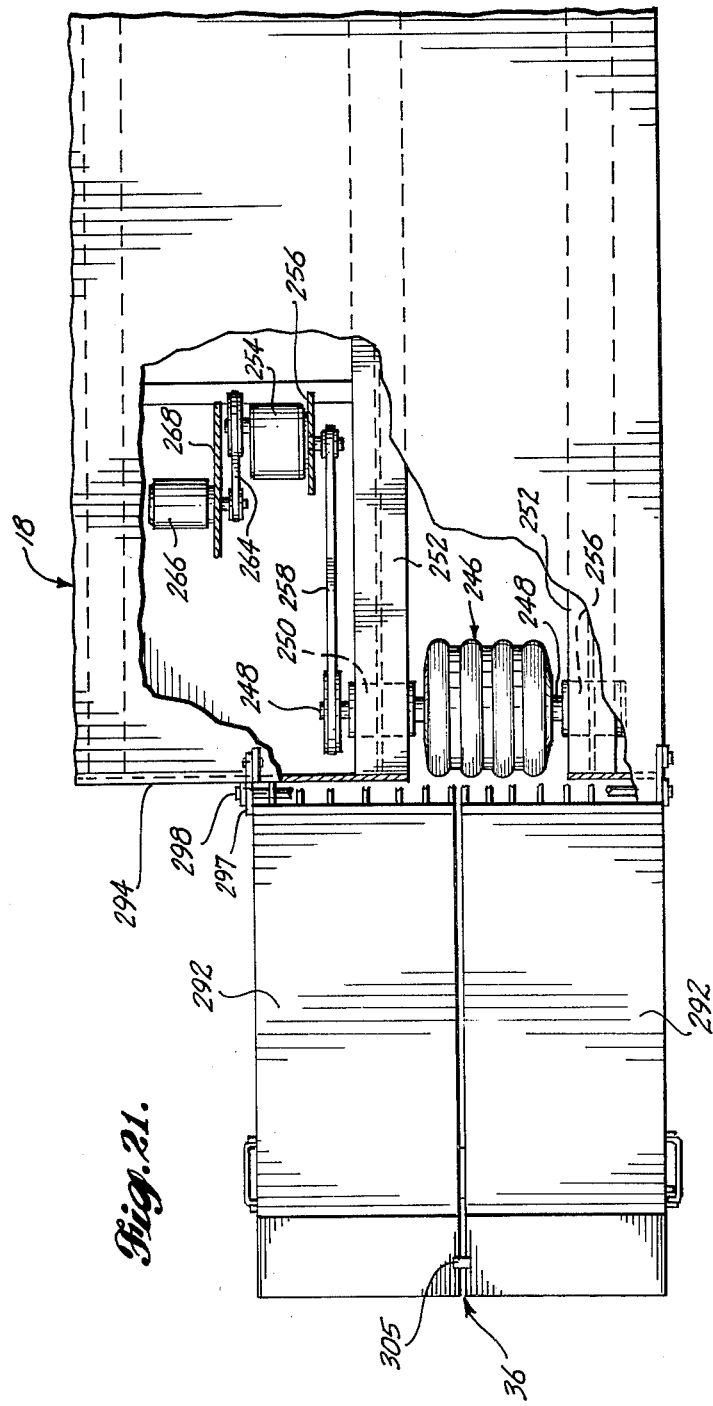
Fig. 20.
Fig. 21.

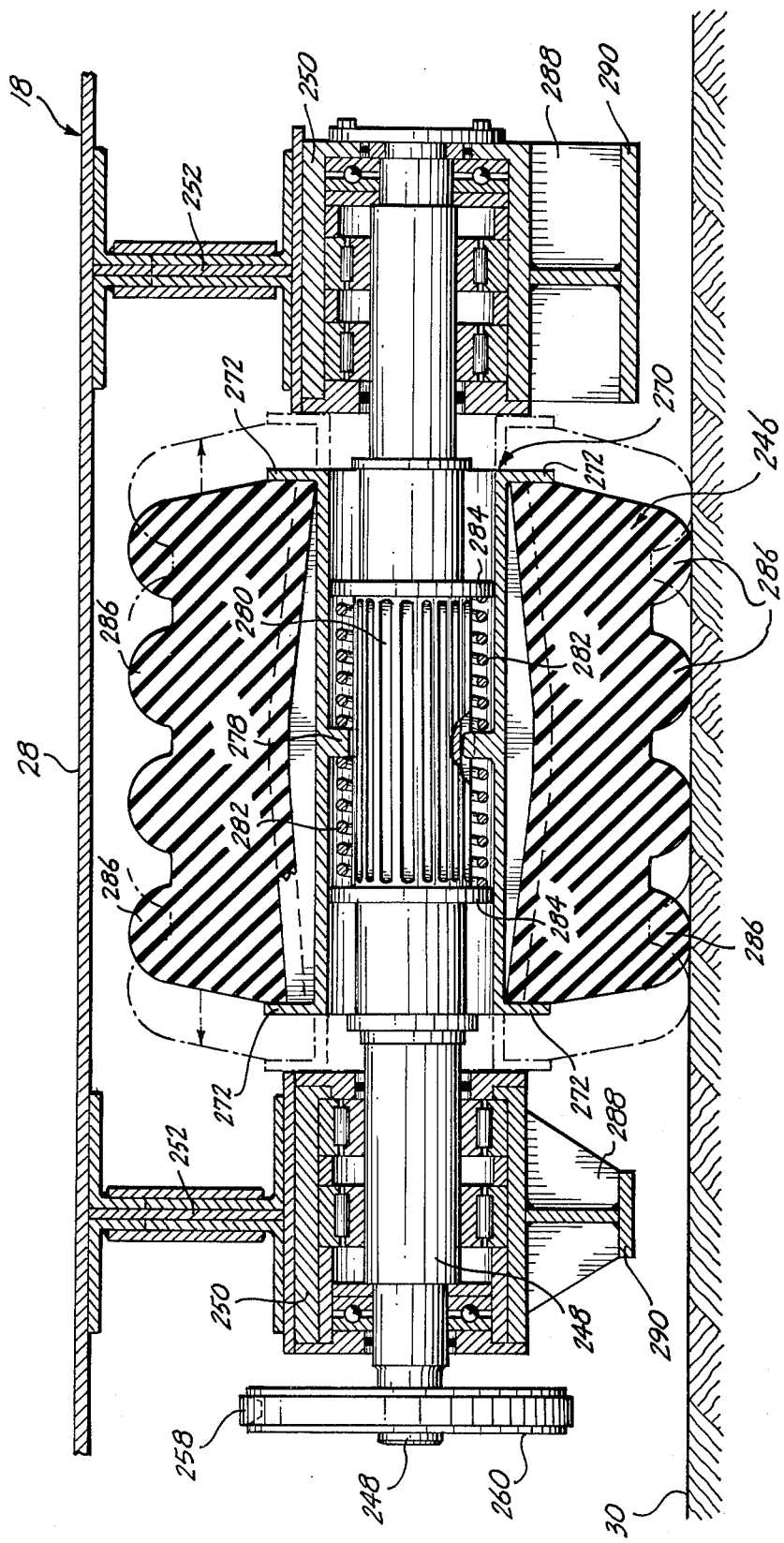

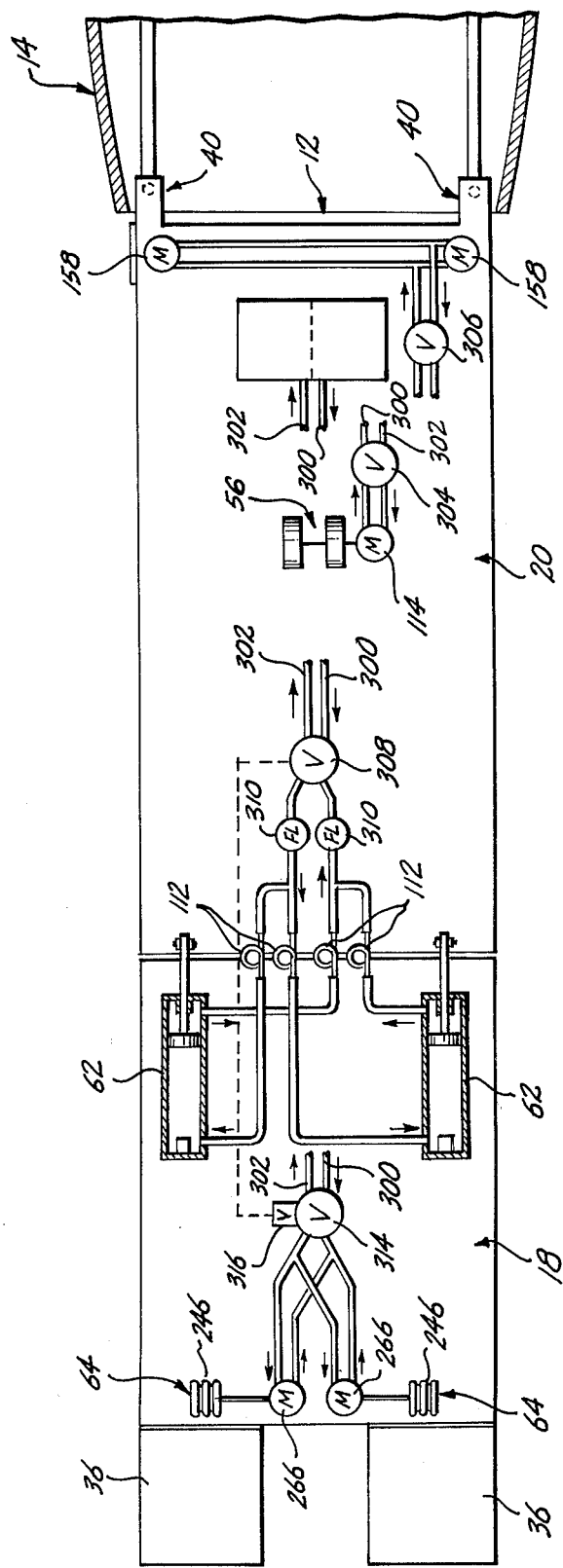

CARGO RAMP

BACKGROUND OF THE INVENTION

This invention relates to cargo handling systems that facilitate movement of cargo into and out of cargo carrying vessels such as ships, barges and aircraft. More specifically, this invention relates to a cargo ramp that is easily stowed onboard a cargo carrying vessel and easily extended from an elevated cargo opening to the surface of cargo handling areas such as a runway, the ground, various loading platforms and docks or quays to provide for the loading and unloading of cargo of various descriptions, including large, heavy self-propelled vehicles.

In the prior art, various ramp arrangements have been proposed for movement of cargo between a cargo carrying vessel and a cargo loading and unloading zone that is at a higher or lower elevation than the cargo deck of the vessel. Basically, such prior art cargo arrangements can be categorized as those which form a portion of the cargo carrying vessel, those which are stored or maintained at a cargo loading and unloading facility and those which are carried onboard the cargo carrying vessel and deployed as the need arises. The cargo ramp of this invention falls into the latter category and, in many respects, provides various improvements over and alternatives to the cargo ramps disclosed in my previously issued U.S. Pat. No. 4,039,163, which is assigned to the assignee of this invention.

U.S. Pat. No. 4,039,163 discloses cargo ramps arranged for storage within the cargo compartment of an aircraft wherein each cargo ramp comprises two or more hinged together ramp sections. Each of these cargo ramps includes a wheel assembly that is mounted to the lower terminus of the ramp assembly for supporting the lower end of the cargo ramp during portions of deployment and retraction sequences in which the cargo ramp is moved outwardly from or inwardly toward the aircraft. During such deployment and retraction sequences, the upper end of the cargo ramp is supported by a first set of deployment fittings that are located along the outside upper edges of the ramp and include rollers that are engageable with guide channels which are mounted on the floor of the aircraft cargo compartment. When the cargo ramp is deployed, a second set of deployment fittings, which are located along the upper edges of the cargo ramp, are engaged with sill fittings that are located below the outer edges of the aircraft cargo opening to securely lock the upper terminus of the cargo ramp to the aircraft.

Although the cargo ramps disclosed in U.S. Pat. No. 4,039,163 and various other prior art cargo ramps are fairly satisfactory in facilitating loading and unloading cargo of the type for which they are intended, there are several areas which remain open for improvement. For example, prior art cargo ramps that are designed for stowage on the cargo carrying vessel generally are configured for use with only a single type of vessel, e.g., ships or aircraft, and often are designed for use with a particular configuration of one of these types of vessels. A cargo ramp having more universal application is desirable both from the standpoint of manufacturing economics and to attain a certain degree of standardization. Further, although various cargo ramps such as those disclosed in U.S. Pat. No. 4,039,163 can be constructed to facilitate large heavy cargo such as wheeled or tracked vehicles that are driven or pulled into and out of the vessel, such prior art cargo ramps are not intended to accommodate extremely heavy construction equipment and military weapons systems that have gross weights in excess of 100,000 pounds and/or single axle load weights as much as approximately 35,000 pounds.

It can be recognized that configuring a cargo ramp for use with extremely heavy cargo and various cargo vessels such as aircraft and ships renders various design constraints more burdensome and introduces various additional constraints that are not met by prior art structure. In this regard the cargo ramp must not only be as light as possible and be configured for rapid operation between the extended and stowed positions, but must accommodate changes in vertical distance between the vessel cargo deck and the surface of the cargo loading and unloading zone. For example, when such a cargo ramp is utilized on a ship or other seagoing vessel variations in tide affect the vertical distance between a cargo deck of the vessel and the surface of a pier or quay. Such variations in vertical distance can also be encountered with a cargo carrying aircraft of the "kneeling" variety wherein the aircraft landing gear and support system is operable to decrease the distance between the aircraft cargo opening and the surface of the runway.

Certain deflections and movement of the cargo ramp and vessel must also be accommodated. First, when cargo of substantial weight is moved upwardly into or downwardly out of a vessel, forces are exerted on the ramp and vessel that can cause rather slight but not insignificant vertical displacement of an aircraft on its landing gear or a ship in the water. Loading and unloading operations can also cause substantial forces to be exerted in a horizontal direction. For example, if a heavy vehicle must be stopped suddenly as it is proceeding down such a cargo ramp, the interface between the upper end of the ramp and the vessel can be subjected to substantial tension.

In addition to the forces and movement caused by the passage of heavy cargo, a suitable cargo ramp arrangement must withstand forces and movement resulting from environmental conditions. For example, with respect to aircraft cargo ramps of the general type disclosed in the previously mentioned U.S. Pat. No. 4,039,163 wherein the ramp extends forwardly and downwardly from a cargo opening within the nose section of the aircraft, near hurricane conditions have been experienced which caused approximately 0.75° of yaw between the ramp and the aircraft. Ramps configured for use with large cargo ships are subject to similar forces and movement in that, although cargo ships suitable for carrying cargo such as large wheeled or tracked vehicles are of substantial size, heavy winds and seas can cause pitching and rolling movements and attendant forces on the cargo ramp and vessel. Unless a cargo ramp is configured to withstand all of the various movements and forces mentioned, large concentrations of force can occur within the cargo ramp-vessel interface region and structural failure can result.

Certain other aspects must be considered in configuring a cargo ramp of the above described type. In this regard, to provide maximum versatility, such a cargo ramp must not only be designed for rapid deployment and storage, but it is also desirable to provide a configuration that can be employed for loading and unloading at relatively unimproved cargo handling facilities. For example, with respect to both ships and aircraft, there is often a need to supply large construction equipment and/or military systems to regions which do not have smoothly surfaced cargo handling zones or to supply such equipment to a cargo handling facility that has been damaged through natural disaster or other causes. Additionally, such a cargo ramp should also be constructed for ease of operation during deployment and stowage and should require a minimum number of operating personnel.

Accordingly, it is an object of this invention to provide a cargo ramp suitable for use with cargo carrying vessels such as aircraft and ships wherein the cargo ramp facilitates the loading and unloading of heavy cargo such as large vehicles and equipment.

It is another object of this invention to provide a cargo ramp of the above mentioned type wherein the cargo ramp is configured for stowage within the vessel and for rapid deployment therefrom.

It is yet another object of this invention to provide a cargo ramp of the above mentioned type wherein the ramp can be employed for loading and unloading cargo at relatively unimproved cargo handling facilities.

Still further, it is an object of this invention to provide a cargo ramp of the above mentioned type that exhibits relatively low weight relative to the cargo ramp load handling capabilities.

Even further, it is an object of this invention to provide a cargo ramp that can be readily stowed and deployed by a minimum number of operating personnel.

SUMMARY OF THE INVENTION

These and other objects are achieved in accordance with this invention by a cargo ramp that comprises two hinged together ramp sections. The cargo ramp is stowed in the cargo compartment or on the cargo deck of a cargo carrying vessel such as a transport-type airplane or ocean going naval vessel during periods of nonuse with the two ramp sections in axial alignment with one another and is deployed to extend outwardly and downwardly from the sill of a cargo opening or cargo deck and the surface of a cargo loading and unloading zone, e.g., the surface of a runway, dock, pier or quay.

To provide rapid deployment and stowage, the upper section of the cargo ramp is equipped with a set of motor-driven deployment wheels that extend downwardly beneath the cargo ramp and contact the deck or floor of the cargo carrying vessel. Two or more spring-loaded guide pin assemblies that are located at spaced apart positions along the central portion of the lower surface of the cargo ramp extend downwardly into a centerline guide channel that is located in the cargo deck of the vessel. The upper terminus of the cargo ramp is supported during stowage, deployment and retraction by a set of two support and deployment assemblies that extend axially from the upper edges of the cargo ramp. Each support and deployment assembly includes an arm having a ball socket located in the outward lower portion thereof. The ball sockets interface with spherical supports that are mounted to carriages which are equipped with tapered rollers that ride in and are retained by spaced apart deployment guide channels in the vessel cargo deck or floor. The deployment guides and the centerline guide channel extend into the cargo region of the vessel in spaced apart parallel relationship with one another to support the ramp and maintain it in proper alignment during the deployment and retraction sequences.

To deploy the disclosed cargo ramps, the motor-driven deployment wheels are activated to move the lower end of the cargo ramp outwardly across the sill region of the cargo opening or deck with the upper end of the cargo ramp being supported by the support and deployment assemblies and the associated carriages which roll along the deployment guides. As the cargo ramp is moved outwardly, the deployment guide pin assemblies remain engaged with the centerline guide channel to maintain the cargo ramp in proper alignment. When the hinge that joins the upper and lower sections of the cargo ramp is positioned slightly outwardly of the cargo opening sill, a power-driven hinge actuator that is configured to swing the lower ramp section about the hinge is actuated to allow the lower terminus of the ramp to swing downwardly.

As the lower end of the cargo ramp reaches the surface of the runway, pier or other conventional cargo loading and unloading zone, wheel assemblies located at the terminus of the lower ramp section come into contact with the loading zone surface and support the cargo ramp so that the upper and lower ramp sections are angularly disposed relative to one another. The motor-driven wheel assemblies are then activated either alone or in combination with the deployment wheels for continued outward movement of the cargo ramp. As the upper terminus of the cargo ramp passes outwardly over the sill of the cargo carrying vessel, outward movement of the ramp is halted by deactivation of the motor-driven ground wheels and, if utilized, the motor-driven deployment wheels. To ensure that the cargo ramp is not driven outwardly over the edge of the cargo opening, the deployment guide channels include sill stops which come into abutment with the forward portion of the deployment carriages. Preferably, in order to cause the cargo ramp to come to a smooth stop, the end region of each deployment guide channel is machined or otherwise contoured so that the tapered rollers of the deployment carriages do not contact the deployment guide channels and frictional contact between the deployment carriages and deployment guide channels is established. With proper positioning of the upper end of the cargo ramp thus established, retention pins that are located in the deployment carriages are engaged with openings in the cargo deck or floor of the vessel to temporarily lock the cargo ramp in position until the deployment sequence is completed.

The powered ground wheels and the hinge actuators are then operated to move the lower end of the cargo ramp outwardly and cause the upper and lower sections of the ramp to come into alignment with one another so that the cargo ramp forms an inclined plane between the sill of the vessel and the surface of the cargo loading and unloading zone. As this portion of the deployment sequence takes place, the upper end of the cargo ramp swings slightly downward and causes a centerline coupling mechanism that is mounted at the center of the upper end of the ramp to engage a coupling hook that is mounted to the vertical face of the vessel at a position below the cargo deck sill region. This centerline coupling mechanism is arranged to provide limited movement in both the vertical and transverse directions. Thus, the centerline coupling mechanism is not subjected to shear, but maintains the upper end of the cargo ramp a predetermined distance from the edge of the vessel cargo deck and reacts tensional forces that are experienced during cargo loading and unloading operations.

With the cargo ramp thus deployed, the retention pins which locked the upper end of the cargo ramp to the vessel during the final portion of the deployment sequence are then disengaged from the openings in the cargo deck to thereby allow limited and outward movement of the cargo ramp on the deployment carriages as heavy cargo is moved into and out of the vessel. Further, to provide a smooth transition between the lower terminus of the cargo ramp and the surface of the cargo loading and unloading zone, toe ramps that are hinged to the lower terminus of the cargo ramp and stowed atop the cargo ramp lower section during ramp stowage and deployment are manually swung downwardly to cover the ground wheels.

To additionally ensure that proper alignment is maintained when the cargo ramp is deployed over rough surfaces such as those strewn with rocks or other obstructions, the ground wheels are mounted on splined axles and spring-loaded wheels encounter an obstacle as the cargo ramp is being moved outwardly away from the vessel, the wheels are allowed to move laterally through a limited distance while the cargo ramp continues to move along the desired path. Thus, in effect, the wheels move around many obstructions without producing laterally directed forces that would tend to misalign the cargo ramp or otherwise impede deployment. Further, to facilitate the loading and unloading of extremely heavy cargo, the ground wheels are constructed to provide substantial traction and exhibit a controlled amount of deflection as heavy cargo passes over the lower portion of the ramp. Preferably, ground bearing pads are mounted to the cargo ramp to project downwardly at a position near each of the ground wheels. When extremely heavy cargo such as large vehicles that could overload the cargo ramp and possibly damage the ground wheels move over the lower portion of the cargo ramp, the ground wheels are compressed and such overload is supported by the ground bearing pads until the cargo reaches the upper portion of the ramp and the load is supported by the vessel. For example, in one disclosed embodiment of the invention, the ground wheels and ground bearing pads are configured and arranged such that the ground wheels support the lower end of the cargo ramp at load forces below 30,000 pounds on each of the wheel assemblies. As extremely heavy cargo such as a large vehicle is moved across the lower portion of the ramp, the ground wheels are compressed and the lower portion of the ramp is supported by the ground bearing pads.

Each disclosed embodiment of the invention also includes a deployment adjustment mechanism which is interconnected with the ramp support and deployment assemblies and allows vertical positioning of the upper end of the cargo ramp to accommodate substantial changes in the distance between the vessel cargo deck and the surface of the cargo loading and unloading zone such as those experienced with kneeling type transport aircraft and those caused by variations in tide when a naval vessel is unloaded at a pier or quay. In the disclosed embodiments of the invention, the deployment adjustment mechanism comprises a motor-driven threaded shaft that is mounted proximate to each of the above mentioned ramp support and deployment assemblies with the threaded shaft being engaged by a threaded nut that is pivotably mounted at one end of a support arm of the support and deployment assembly. Since each support arm is pivotably interconnected with the cargo ramp by means of a retention pin mounted through the central portion of the support arm, operation of the motors that operate the threaded shafts of the deployment adjustment mechanism cause the upper end of the ramp to swing through an arc that raises and lowers the upper terminus of the ramp and thereby permits adjustment to maintain a smooth transition between the ramp and the floor or deck of the vessel.

To provide substantially automatic deployment and retrieval, the above mentioned motors for activating the deployment wheels, ground wheels, hinge actuators and deployment adjustment mechanisms are preferably integrated into a single control system. In this regard, hydraulic motors are utilized in the disclosed embodiments of the invention and suitable hydraulic pressure is provided by a reservoir and pump that is located within the upper ramp section. Electrically actuated valves, which are operated via a control panel, selectively activate the hydraulic motors to deploy the ramp in the above described manner and provide retrieval and stowage of the ramp by essentially reversing the above described deployment sequence.

BRIEF DESCRIPTION OF THE DRAWINGS

These and other advantages and features of the present invention will be understood upon reading the following detailed description, taken together with the accompanying drawings in which:

FIG. 5 is a partial perspective view of the cargo opening and cargo deck of an aircraft employing the present invention which illustrates deployment guide channels and a centerline guide channel that are utilized in deploying and retrieving the cargo ramp;

FIGS. 6 and 7 are cross-sectional views of the deployment guide channels and centerline guide channel which are respectively taken along the lines 6—6 and 7—7 of FIG. 5;

FIG. 8 is a transverse cross-sectional view of a portion of the cargo ramp of FIG. 1 which depicts a centerline guide pin assembly for maintaining a cargo ramp of this invention for proper alignment during deployment and retrieval;

FIG. 9 is a partial side view of the upper end of the cargo ramp of FIG. 1 which depicts a motor-driven deployment wheel assembly that are operated during deployment and retrieval of a cargo ramp of this invention to move the cargo ramp into and out of the cargo compartment;

FIG. 10 is an enlarged, partially cutaway view of the deployment wheel assembly of FIG. 9;

FIG. 11 depicts the deployment wheel assembly of FIGS. 9 and 10, as viewed in the direction of arrows 11—11 in FIG. 10;

FIG. 12 is a side elevation view of the upper portion of a cargo ramp constructed in accordance with this invention which depicts the ramp support and deployment assembly and the associated deployment adjustment mechanism;

FIG. 13 is a cross-sectional view taken along the lines 13—13 of FIG. 12 which further illustrates the deployment adjustment mechanism;

FIG. 14 is a partial perspective view of the upper terminus of a cargo ramp of this invention which further illustrates the ramp support and deployment mechanism and depicts the carriage assembly which interconnects the upper end of the cargo ramp with the deployment guide channels;

FIG. 15 is a cross-sectional view of a portion of the ramp support and deployment assembly and associated carriage which is taken along the lines 15—15 of FIG. 14;

FIG. 18 is a partially cutaway side view of the central region of the cargo ramp which illustrates the cargo ramp hinge and hinge actuator configuration;

FIG. 19 is a partially cutaway plan view of the central portion of the cargo ramp which further illustrates the cargo ramp hinge and hinge actuator of FIG. 18;

FIG. 20 is a side view of the lower terminus of a cargo ramp constructed in accordance with this invention which illustrates the ground wheel assemblies and hinged toe ramp sections that are deployable to form a smooth transition between the lower end of the cargo ramp and the surface of the cargo loading and unloading zone;

FIG. 21 is a partially cutaway top view of the lower terminus of the cargo ramp which further illustrates the toe ramps and ground wheel assemblies of FIG. 20;

FIG. 22 is a transverse cross-sectional view of the ground wheel assembly which is taken along the lines 22—22 of FIG. 21; and FIG. 23 schematically depicts a hydraulic system for operating the cargo ramp during deployment and retrieval.

DETAILED DESCRIPTION

Figure 1:
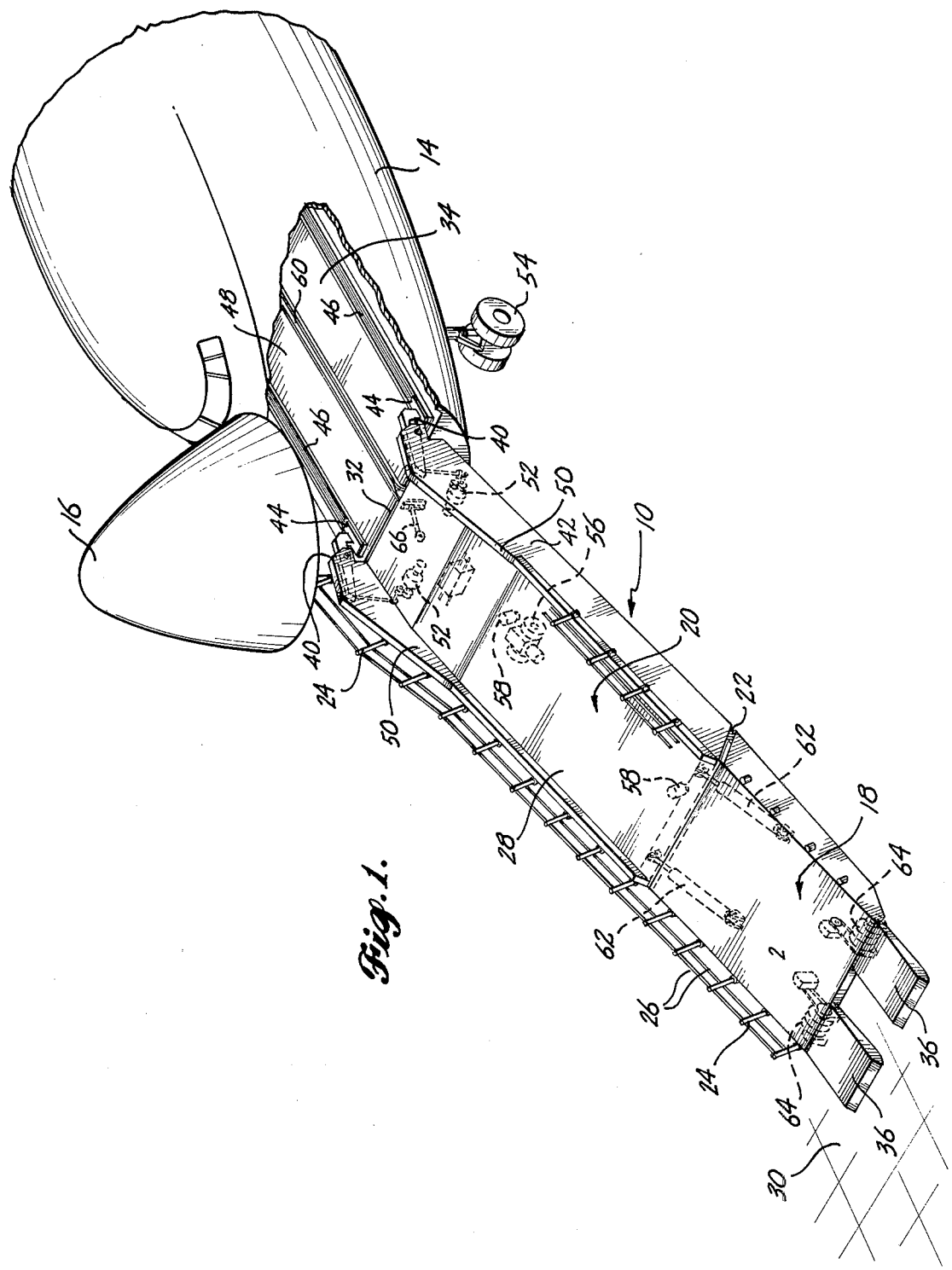
FIG. 1 is a perspective view depicting a cargo ramp constructed in accordance with this invention deployed between the cargo opening of an aircraft and the surface of a runway.

FIG. 1 depicts the basic configuration of the cargo ramp 10 of this invention with the cargo ramp 10 deployed from a forward cargo opening 12 formed in the fuselage of an aircraft 14 by an upwardly swingable nose section 16. Aircraft configured in such manner are known in the art and are just one example of cargo carrying aircraft that can advantageously employ this invention. Further, upon understanding this invention it will be recognized by those skilled in the art that the cargo ramp 10 can be utilized in conjunction with a variety of cargo carrying vessels such as ships and barges wherein cargo must be transported between an elevated deck or cargo opening of the vessel and a cargo loading and unloading zone such as the surface of a pier, dock or quay.

As depicted in FIG. 1, cargo ramp 10 basically comprises a lower ramp section 18 which is pivotably joined to an upper ramp section 20 by hinges 22 that are located along the lower region of the juncture between lower ramp section 18 and upper ramp section 20. Each ramp section 18 and 20 can be constructed in a conventional manner to include structural members and spacers that are interconnected to form a relatively light-weight frame. In such an arrangement, the exterior boundaries defined by this frame are covered with metal panels to form an outer covering or skin. If desired or necessary, cargo ramp 10 can include a guard rail comprising upright posts 24 and cables 26 that is erected along the longitudinal boundary edges of cargo ramp 10 by insertion of posts 24 in suitably sized openings in the upper surface 28 of cargo ramp 10.

In accordance with the invention, cargo ramp 10 is configured for rapid deployment and retrieval between a stowed position within the aircraft 14 or other cargo carrying vessel (FIG. 2) and the extended position of FIG. 1 wherein cargo ramp 10 provides a bridge between cargo opening 12 and the surface of a cargo loading and unloading zone such as the surface of the runway 30 in FIG. 1. To provide rapid deployment and retrieval and to securely interconnect cargo ramp 10 with the sill region 32 of aircraft 14 or a similar upwardly extending surface of a cargo carrying vessel, cargo ramp 10 includes a number of various components which collectively comprise a deployment and retrieval system and a cargo ramp-to-vessel interface system. Additionally, the aircraft 10 or other vessel employing the invention is equipped with components which structurally interconnect and interact with both the ramp deployment and retrieval system and the cargo ramp-to-vessel interface system. Each of the above mentioned components are schematically indicated in FIG. 1 and, prior to describing the exemplary arrangements thereof that are depicted in FIGS. 5 through 23, can be understood with reference to FIGS. 1 through 4.

Figure 2:
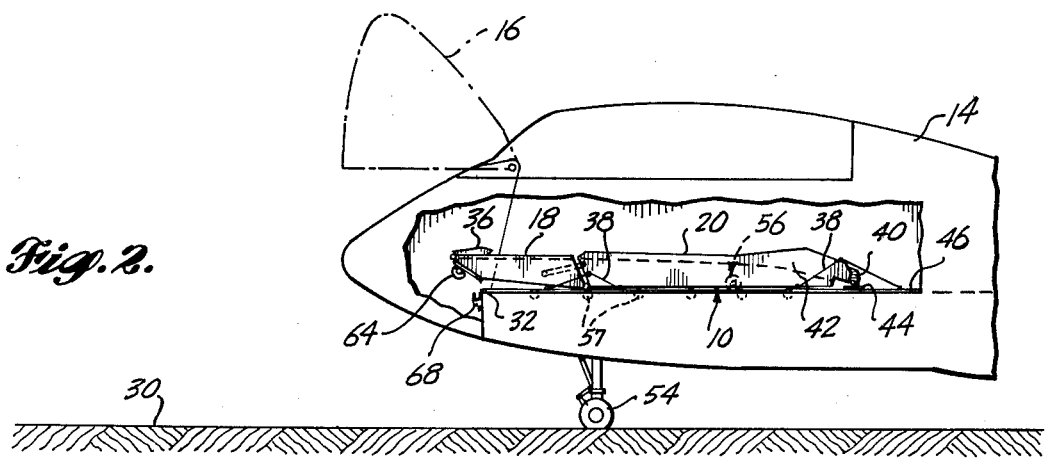
FIG. 2 is a partial elevation view depicting the cargo ramp of FIG. 1 stowed within the cargo compartment of the aircraft.

More specifically, as is illustrated in FIG. 2, the cargo ramp 10 is stowed within the cargo compartment 34 of the aircraft 14 with lower and upper ramp sections 18 and 20 in longitudinal alignment with one another. Toe ramps 36, which are swingable about the lower terminus of lower ramp section 18 to form an inclined, smooth transition between runway 26 and the lower end of cargo ramp 10 (FIG. 1), are folded against and temporarily interconnected with the upper surface 28 of lower ramp section 18 during stowage within the aircraft 14. To secure cargo ramp 10 during stowage, conventional tie downs such as chains or cables 38 can be fastened between eye bolts or other conventional fastening devices (not specifically illustrated in FIGS. 1 through 4) that are located on the cargo ramp 10 and within cargo compartment 34.

In the stowed position of FIG. 2, the upper end of cargo ramp 10 is supported by an upper ramp support and deployment assembly 40 which extends longitudinally outward from the upper terminus of the oppositely disposed side walls 42 of upper ramp section 20. As shall be described in more detail relative to FIGS. 12 through 15, the outer end of the upper support and deployment assemblies 40 are configured to form a ball and socket interconnection with roller equipped carriages 44 that ride in and are retained by deployment guide channels 46 which are mounted in parallel spaced apart relationship within one another in the floor or deck 48 of cargo compartment 34. As can be best seen in FIG. 1, the deployment guide channels 46 extend orthogonally inward from the cargo opening sill region 32. As can be further seen in FIG. 1, the upper ramp support and deployment assemblies 40 are mounted in and partially contained by curbs 50 that project upwardly from the side walls 42 and extend longitudinally between the upper terminus and lower terminus of upper ramp section 18. As shall be described in more detail hereinafter, deployment adjustment mechanisms 52 are mounted wihin the interior portion of the upper ramp section 20 and extend through each curb 50 to interconnect with the upper ramp support and deployment assemblies 40. These deployment adjustment mechanisms 52 are motor-driven and raise and lower the upper end of the cargo ramp 10 to provide a smooth transition between the ramp and the cargo compartment floor 48. In accordance with the invention, deployment adjustment mechanisms 52 are generally set at a position compatible with the particular type of aircraft or vessel employing the cargo ramp 10 and need only be operated when substantial changes occur in the vertical distance between the surface of a cargo loading and unloading zone and the sill region 32. Such changes in vertical distance can occur, for example, if the cargo ramp 10 must be deployed to an elevated cargo platform or if and aircraft 14 is equipped for "kneeling" operation wherein the aircraft nose gear 54 is fully or partially retracted to decrease the distance between the sill 32 of cargo compartment 34 and the surface of runway 30. Similar changes in vertical distance between the surface of a cargo loading and unloading zone and the cargo opening or deck of a cargo carrying vessel can be experienced when cargo ramp 10 is employed by a ship or barge and the vessel must load or unload at a dock or quay under various or continually changing tidal depths.

Figure 3:
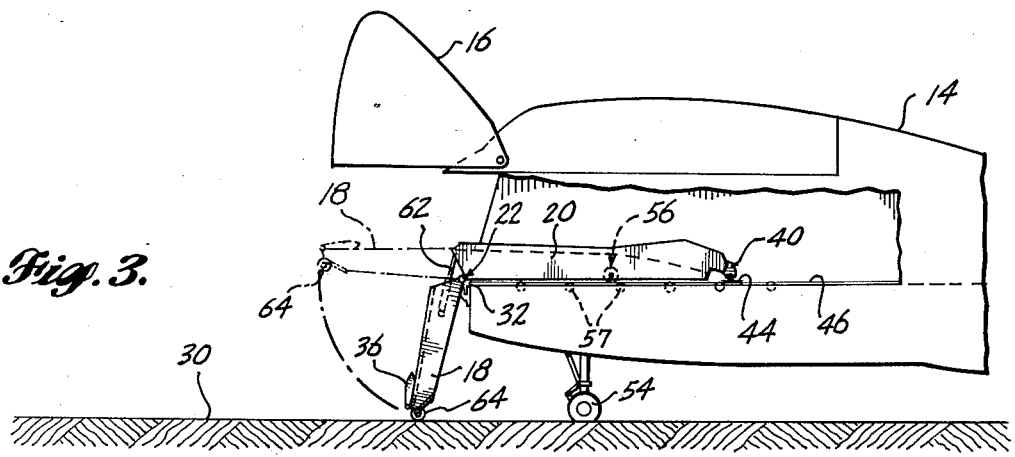
FIGS. 3 and 4 are partial elevation views illustrating the deployment and retrieval sequence utilized to move the cargo ramp of FIG. 1 between the fully deployed position that is depicted in FIG. 1 and the stowed position that is depicted in FIG. 2.

As is depicted by the phantom lines of FIG. 3, when the cargo ramp 10 is moved from the stowed position of FIG. 2 to the deployed position of FIG. 1, the tie downs 38 are removed and the cargo ramp is moved forwardly until the hinges 22 are positioned slightly forward of the sill region 32. To facilitate this movement of cargo ramp 10, the depicted embodiment of the invention includes a set of motor-driven deployment wheels 56 that are mounted to extend downwardly from the lower surface of upper ramp section 20. As the cargo ramp 10 is moved in the forward direction, the ramp is supported by the upper ramp surface support and deployment assemblies 40 and associated roller carriages 44 and by rollers 57 which can be the conventional cargo rollers of aircraft 14 or can be provided at spaced apart positions on the lower surface of cargo ramp 10. To maintain the cargo ramp 10 in proper alignment during this and subsequent portions of the deployment and retrieval sequences, guide pin assemblies 58 (FIG. 1) that extend downwardly from the lower surface of upper ramp section 20 ride in and are contained by a centerline deployment channel 60 which is mounted to extend longitudinally along the central region of the cargo deck 48.

With the hinges 22 positioned outwardly of the sill region 32, hinge actuators 62 which are mounted to swing the lower ramp section 18 about the hinges 22 are activated to permit lower ramp section 18 to swing downwardly toward runway 30. When the lower end of cargo ramp 10 reaches runway 30, the lower terminus of the ramp is supported by powered ground deployment wheels 64 and cargo ramp 10 attains the position depicted by the solid lines of FIG. 3. As shall be described in more detail relative to FIGS. 20 through 22, ground deployment wheels 64 are mounted for limited movement in the transverse direction to eliminate or reduce interference from rocks or other obstacles that may be located on the runway 30. Further, the ground deployment wheels are preferably constructed for limited compression or deflection as heavy cargo passes over the lower portion of cargo ramp 10 and are equipped with ground bearing pads which contact the surface of the runway 30 and support the lower end of cargo ramp 10 when extremely heavy loads pass directly over the ground deployment wheels 64. For example, in one embodiment of the invention, ground deployment wheels 64 are constructed and arranged such that the lower end of cargo ramp 10 is supported by the ground bearing pads whenever a load force exceeding 30,000 pounds is applied to each ground deployment wheel.

Figure 4:
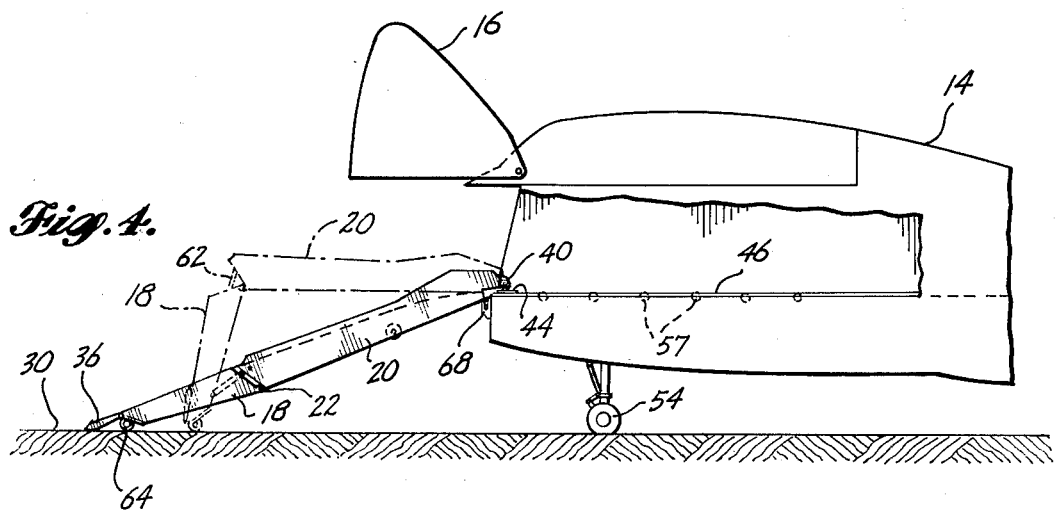

The next step in the deployment of cargo ramp 10 is the activation of ground deployment wheels 64 and, if desired or necessary, deployment wheels 56 to move cargo ramp 10 outwardly through the cargo opening 12 until it reaches the position depicted by the phantom lines of FIG. 4 wherein the upper terminus of upper ramp section 20 is positioned slightly outward of sill region 32. Preferably, the upper end of cargo ramp 10 is temporarily restrained from additional outward and inward movement relative to sill region 32 and the hinge actuators 62 are operated in conjunction with ground deployment wheels 64 to move the lower end of cargo ramp 10 outwardly while simultaneously swinging upper and lower ramp sections 18 and 20 into the aligned, deployed position. As the lower end of cargo ramp 10 is moved outwardly, the upper end of the cargo ramp swings slightly in the downward direction and a centerline coupling mechanism 66 (FIG. 1) that is mounted within the upper portion of the cargo ramp and projects outwardly therefrom moves into engagement with a hook 68 that projects outwardly from the lower portion of sill region 32. As is described in more detail relative to FIGS. 16 and 17, the centerline coupling mechanism 66 is arranged for limited movement in the vertical and transverse directions and thus functions to react forces that tend to move the cargo ramp 10 toward or away from aircraft 14.

With cargo ramp 10 in the extended or deployed position that is depicted by the solid lines of FIG. 4 and the perspective view of FIG. 1, the toe ramps 36 are swung downwardly from the stowed position to form a smooth extension of the upper surface 28 of cargo ramp 10 and the previously mentioned temporary restraints at the upper terminus of cargo ramp 10 are released. The upper end of cargo ramp 10 is then supported and restrained by the upper ramp support and deployment assemblies 40 which, through the roller equipped carriages 44, permit limited vertical movement of the upper end of the cargo ramp when the cargo ramp 10 or aircraft 14 are subjected to slight movement or deflection as heavy cargo is moved into or out of the aircraft cargo compartment 34. Further, as shall be described in more detail hereinafter, one or both of the upper ramp support and deployment assemblies 40 are constructed to permit limited transverse movement wich can be caused, for example, by heavy side winds or slight pitching and rolling of a waterborne cargo vessel.

Preferably, the above-mentioned drive units of the deployment adjustment mechanism 52, deployment wheels 56, ground deployment wheels 64 and hinge actuators 62 are operatively interconnected with one another to form an integrated control system whereby a single operator can effect the described deployment sequence and also retrieve cargo ramp 10 by reversal of the described sequence. In the specific embodiment of the invention described hereinafter, each of these devices is hydraulically operated from a hydraulic reservoir and pump unit 70 that is mounted within the interior of upper ramp section 20 (FIG. 1).

With reference to FIGS. 5 and 6, each deployment guide channel 46 is an extrusion having an upwardly extending central region 72 and upwardly extending flanges 74 along each longitudinal edge thereof. The upper region of each of flanges 74 includes an inwardly projecting lip 76 which defines a longitudinally extending retention groove 78 in the lower portion of deployment guide channels 46. As depicted in FIGS. 14 and 15 and described in more detail hereinafter, retension grooves 78 serve as tracks or guides for receiving and containing the lower portion of the above-mentioned carriages 44. Although in some installations, the deployment guide channels 46 can be mounted to project upwardly from the cargo deck 48, it is often advantageous to position each deployment guide channel 46 in a recess 80 that extends longitudinally along the cargo deck 48. In such an arrangement, the deployment guide channels 46 can be secured to the cargo deck 48 by means of U-shaped channels 82 that extend along the outer surface of the upwardly extending flanges 74 with the channels 82 being affixed to the cargo deck 48 with conventional fasteners such as bolts 84. To ensure that the upper end of cargo ramp 10 is not allowed to inadvertently pass beyond the sill region 32, a sill stop 86 forms a barrier across the end of each guide channel 46. Depending on the situation at hand, the sill stops 86 can be integrably formed in sill region 32 or can be a separate component that is welded or otherwise fastened to deployment guide channels 46.

With reference to FIGS. 5 and 7, the centerline guide channel 60 is an extrusion which includes two upwardly projecting, spaced apart flanges 88 that define a shallow, longitudinally extending recess 90. Centerline guide channel 60 is bolted or otherwise affixed to the central region of the cargo deck 48. Preferably, the terminal region of centerline guide channel 60 which is mounted adjacent sill region 32 is machined or otherwise contoured so that the central recess 90 flares outwardly and downwardly to ensure engagement with the deployment guide pins 58 during cargo ramp deployment and retrieval procedures.

Although various arrangements can be satisfactorily employed as the deployment guide pins 58, the configuration depicted in FIG. 8 is presently preferred. In this arrangement, each guide pin assembly 58 includes a substantially cylindrical housing 92 that includes an outwardly extending flange 94 at each end thereof. The flanges 94 are bolted or otherwise connected to structural members of the upper ramp section 20 such as the depicted U-shaped beam members 96. The housing 92 of each deployment guide pin assembly 58 includes a downwardly facing counterbored opening 98. An index stud 100 having a cylindrical head region 102 that is slidably received within the lower region of counterbored opening 98 and a threaded shank portion 104 is retained within the cylindrical housing 92 by a nut 106. A compression spring 108, positioned between the head region 102 of index stud 100 and the end of the counterbored region of opening 98 maintains the head region 102 of index stud 100 in contact with the recess 90 of centerline guide channel during portions of the deployment and retrieval sequences in which upper ramp section 20 is located within cargo compartment 34.

Referring now to FIGS. 9-11, the deployment wheel assembly 56 of the illustrated embodiment is located within an upwardly extending recess or cavity 110 in the lower surface 112 of upper ramp section 20. In the depicted arrangement, a motor 114 is mounted to a beam or brace 116 which extends transversely across the upper ramp section 20 to support a panel 118 that forms the lower boundary of the cargo ramp upper surface 28. A conventional geared reduction unit 120 is mounted to extend downwardly from a similar beam member 122 with the reduction unit 120 having an input shaft that is coupled to the output shaft of motor 114 by a set of gears 124. The output shaft 126 of reducer unit 120 extends transversely through the lower portion of the reducer unit and a wheel 127 is mounted at each end of shaft 126. As can be seen most clearly in FIG. 11, the wheels 127 are thus positioned to straddle centerline guide channel 60. Preferably, the wheels 127 include pneumatic tires or are otherwise configured to deflect or deform under the weight of cargo ramp 10 to thereby frictionally engage the cargo deck 48 and thus allow the cargo ramp 10 to be moved inwardly and outwardly across the cargo rollers 57 in the manner described relative to FIGS. 1-4.

With reference to FIGS. 12-15, the upper ramp support and deployment assembly 40 and the deployment adjustment mechanism 52 of the illustrated embodiment include support arms 128 that are pivotably mounted within the interior terminal portion of each curb 50 to extend longitudinally outwardly therefrom for interconnection with the associated carriages 44. The end of each support arm 128 that is located within curb 50 is engaged to a motor driven threaded shaft 130 of the deployment adjustment mechanism 52 which, when rotated, swings the outer end of the support arms 128 through an arc and thereby raise and lower the upper terminus of the ramp in the previously mentioned manner. More specifically, each support arm 128 is a cast or formed member having a forked end region 132 which encompasses a threaded nut 134 that is pivotably mounted to the oppositely disposed sidewalls of the forked region 132. The nut 134 is engaged with the threaded rod 130 which extends upwardly through the interior region of the curb 50. A retention pin 136, which passes transversely through the upwardly extending sidewalls 138 of the curb 50, pivotably attaches the support arm 128 to the upper terminus of cargo ramp 10. The outer arm of each support arm 128 includes a downwardly facing socket fitting 140 which interfaces with the associated carriage 44.

With particular reference to FIGS. 12 and 13, the threaded rod 130 of the deployment adjustment mechanism 52 is mounted for rotation within the curb 50 by thrust bearings 142 that extend between the curb sidewalls 138. Each threaded rod 130 is rotated by means of a worm drive 144 that is contained between the upper and lower surfaces 28 and 112 of upper ramp section 20 and extends through bearings 146 that are mounted in the ramp sidewall 142 and longitudinally extending, spaced apart stiffeners 148. Worm drive 144 is coupled to a shaft 150 that passes through the spaced apart longitudinal stiffeners 148 by means of a set of gears 152. The shaft 150 is coupled to the output shaft of a gear reducer 154 through a conventional flexible coupling 156. As can be best seen in FIG. 13, the gear reducer 154 is mounted to a third longitudinal stiffener 148 that is located inwardly of the stiffeners 148 that support and contain the gears 152. The input shaft of gear reducer 154 is operatively coupled to the shaft of a motor 158 through a second flexible coupling 160 with the motor 158 being mounted to a fourth longitudinally extending stiffener 148. Thus, when the motor 158 is energized, the threaded shaft 130 is rotated to, in turn, move the forked end region 132 of the support arm 128 upwardly or downwardly. This action causes the support arm 128 to swing about the retention pin 136 and thus provide upward and downward adjustment in the elevation of the upper end of cargo ramp 10.

As depicted in FIGS. 14 and 15, the socket fitting 140 of each support arm 128 interfaces with a spherical support 162 that rides in a contoured receptacle 163 formed in the upper surface of a carriage 44. As previously mentioned, each carriage 44 is guided by and retained in an associated deployment guide channel 46. Preferably, one or both of the socket fittings 140 are not rigidly affixed to the lower portion of the support arm 128, but are arranged to permit limited movement of the support arm 128 and the upper terminus of cargo ramp 10 about a longitudinal axis extending through the carriage 44. More specifically, in the depicted arrangement, the socket fitting 140 includes two spaced apart flange members 164 that extend upwardly from a rectangular lower region 166 of socket fitting 140. The flanges 164 pass upwardly into a longitudinally extending opening or recess 168 in the lower portion of the support arm 128. A shaft 170, which passes inwardly through suitably sized openings in the support arm 128 and flanges 164, pivotally attaches the socket fitting 140 to the support arm 128 so that a contoured receptacle 172 in the lower face of the socket fitting 140 partially encompasses the spherical support 162 of the carriage assembly 44. A retaining plate 173 is bolted or otherwise fastened to the end surface of the support arm 128 to retain the shaft 170. Since the opening 168 in the support arm 128 is larger than the upwardly extending flanges 164 of the socket fitting 140, limited movement of the upper terminus of cargo ramp 10 is permitted. Such limited movement is experienced, for example, during the loading and unloading of heavy cargo or can be caused by environmental forces such as relatively high crosswinds and, in the case of a waterborne vessel, pitching and rolling that is caused by wave action.

With continued reference to FIGS. 14 and 15, each carriage 44 consists of a substantially rectangular upper plate 174 and a lower plate or shoe 176 of substantially commensurate dimensions that is bolted or otherwise fastened to the upper plate 174. As is most clearly illustrated in FIG. 14, the longitudinal edges of the shoe 176 are configured to form outwardly extending guide members 178 that extend into the retention grooves 78 of a deployment guide channel 46 and thereby maintain the carriage 44 in engagement with the deployment guide channel 46. A groove 180 which extends longitudinally along the lower surface of the shoe 176 receives the upwardly extending central region 72 of the deployment guide channel 46. To facilitate movement of cargo ramp 10 into and out of the cargo opening 12, each carriage 44 includes four pairs of tapered rollers 182 that are mounted on spaced apart shafts 184 that extend transversely across the carriage 44. As can be seen in both FIGS. 14 and 15, the tapered rollers 182 are mounted within openings that are formed in upper plate 174 and the shoe 176, with the lower surface of each tapered roller 182 contacting the upper surface of deployment guide channels 46. As previously mentioned, the central region of each carriage 44 includes an upwardly facing receptacle 163 for receiving the lower portion of the spherical support 62 and the socket fitting 140 of upper ramp support and deployment assembly 40 extends downwardly to encompass the upper portion of spherical support 162.

To prevent disengagement of the socket fitting 140 from the spherical support 162, each carriage 44 includes a hinge tab 186 that is pivotably attached to the upper plate 174 of carriage 44 at a position adjacent the spherical support 162. Hinge tab 186 includes a central opening 188 that passes over and encompasses a rod-like retainer 190 of the socket fitting 140 when the hinge tab 186 is swung upwardly as depicted by the solid line and phantom line views of FIG. 15. A retaining pin 192 is inserted through a suitably sized opening in the retainer 190 to maintain the hinge tab 186 in engagement with the retainer 190.

To prevent inwardly and outwardly movement of the cargo ramp 10 during portions of the previously described deployment and retrieval sequences in which the hinge actuators 62 are operated to swing lower ramp section 18 about the hinges 22, the rear portion of each carriage 44 includes a spring-loaded retention pin 194 that projects downwardly through the carriage upper plate 174 and shoe 176. When the upper terminus of cargo ramp 10 is positioned slightly outward of the sill region 32 of the aircraft 14 (as depicted in FIG. 4), the spring-loaded retention pins 194 come into alignment with a downwardly extending opening 196 in the central raised region 72 of deployment guide channels 46. Preferably, spring-loaded retention pins 194 are of the conventional type which can be latched in an upward position and released by rotating the pin approximately 90°. Additionally, that portion of the central region 72 of the deployment guide channel 46 which adjoins an opening 196 is preferably beveled downwardly toward the opening 196. With this arrangement retention pins 194 can be released at the beginning of a deployment sequence and will automatically engage with the openings 196 when the upper terminus of cargo ramp 10 passes outwardly across sill region 32. To ensure that the cargo ramp 10 comes to a smooth gradual stop as the retention pins 194 move into alignment with the openings 196, the terminal portion of the deployment guide rails 46 are preferably machined or formed so that the tapered rollers 182 lose contact with the deployment guide channels 46 and portions of the shoe 176 come into frictional contact with adjoining regions of the deployment guide channel. For example, by machining away the portions of the guide channel 46 that normally support the tapered rollers 182, the lower region of the shoe 176 can be caused to frictionally contact the lower boundary regions of retention groove 78 and the upper surface of the flanges 74 of deployment guide channels 42 can be caused to contact the adjoining region of shoe 176.

Figure 16:
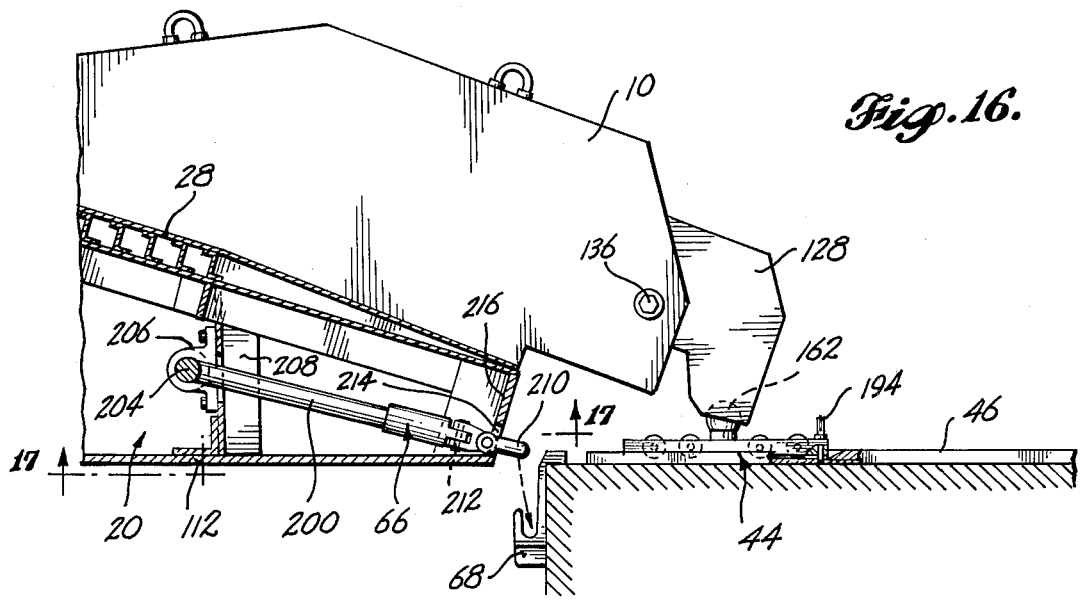
FIG. 16 is a side view of the upper end of a cargo ramp of this invention which illustrates a centerline coupling mechanism for interconnecting the deployed cargo ramp with the sill region of the cargo opening.
Figure 17:
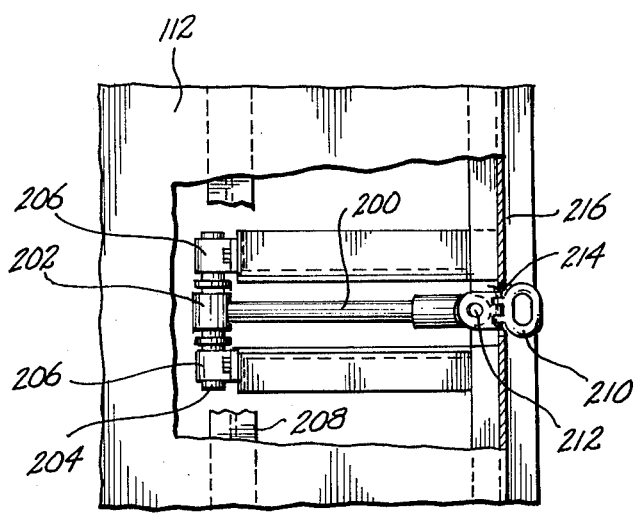
FIG. 17 is a partially cutaway view of the cargo ramp centerline coupling mechanism taken along the lines 17—17 of FIG. 16.

Turning now to FIGS. 16 and 17, the detailed structure of centerline coupling mechanism 66, which as previously described, automatically engages with and disengages from hook 68 during that portion of the deployment and retrieval sequence in which hinge actuators 62 swing lower ramp section 18 about hinges 22, will be described. As is depicted in these figures, the centerline coupling mechanism 66 includes a cylindrical tension arm 200 having a transverse cylindrical end region 202 which pivotably attaches tension arm 200 to a shaft 204. The shaft 204 extends between two spaced apart bearings 206 which are mounted to a transverse bulkhead 208 that extends between the upper surface 28 and lower surface 112 of upper ramp section 20. The opposite end of tension rod 200 is interconnected with a coupling ring 210 by a pin 212 which allows transverse pivotable movement of the coupling ring 210 on the tension arm 200. As can be best be seen in FIG. 16, tension arm 200 and coupling ring 210 are dimensioned and arranged such that the coupling ring 210 projects outwardly through an opening 214 in the forward boundary face 216 of upper ramp section 20. Thus, the coupling ring 210 is positioned above the stationary hook 68 in the manner depicted in FIGS. 16 and 12 when the cargo ramp is in the forwardmost position and the spring-loaded retension pins 194 are engaged to prevent inward and outward movement of the cargo ramp 10 during activation of the hinge actuators 62 in the above-described deployment and retrieval sequences. As is most clearly illustrated by the phantom line and solid line views of FIG. 12, as the hinge actuators 62 swing lower ramp section 18 about the hinges 22 during the deployment and retrieval sequence, the upper end of cargo ramp 10 moves through an arc which causes coupling ring 210 to automatically engage with and disengage from coupling hook 68.

In view of the above description of centerline coupling mechanism 66, upper ramp support and deployment assembly 40, deployment adjustment mechanism 52 and carriages 44, it can be recognized that the upper terminus of cargo ramp 10 is supported by support arms 128 and carriages 44 during deployment and retrieval of cargo ramp 10 and, because of the particular arrangement of socket fitting 140 and spherical support 162, limited movement can occur between cargo ramp 10 and the aircraft 14 when the cargo ramp 10 is in the fully deployed position. Thus, neither the cargo ramp 10 nor portions of the system which interconnect cargo ramp 10 to the aircraft 14 are subjected to concentrated load forces should movement occur as heavy loads pass over the cargo ramp or should lateral forces be exerted on the cargo ramp 10 which tend to misalign the cargo ramp during the deployment sequence and move the cargo ramp laterally from its aligned position while it is deployed. Further, it can be recognized that the centerline coupling mechanism 66 does not react to any vertical or transverse forces, but serves to maintain the upper end of cargo ramp 10 at a predetermined distance from the outer surface of the aircraft 14. That is, tension rod 200 of centerline coupling mechanism 66 is placed under tension as heavy loads cross the upper region of the cargo ramp 10 or as other forces act on the cargo ramp which would tend to move the upper terminus of cargo ramp 10 away from aircraft 14.

FIGS. 18 and 19 depict one arrangement that can be satisfactorily employed in realizing the previously described hinges 22 and hinge actuators 62. In this arrangement, the longitudinal members which form the lower framework of lower ramp section 18 include a number of spaced apart hinge forgings 214 having a flange 216 that extends between spaced apart flanges 218 in similar hinge forgings 220 that are located within and form longitudinal lower frame members of upper ramp section 20. Pins 222 pass through openings in the flanges 216 and 218 to pivotably interconnect the forgings 216 and 220. Hinge actuators 62, which in the depicted arrangement are conventional hydraulic cylinders which linearly extend and retract a rod 224 are located between the spaced apart hinge forgings 214 of lower ramp section 18. More specifically, one end of each hinge actuator 62 is pivotably mounted to a bracket 226 that is mounted on a bulkhead 228 which extends laterally across the interior region of lower ramp section 18. Preferably, the bracket 226 is in alignment with and fastened to a longitudinal frame member 230. The translatable rod 224 passes through an opening 232 in the end face 234 of lower ramp section 18 with the outer end of the rod 224 being pivotally connected to a bracket 236 by means of a pin 238. The bracket 236 is similar in construction to the bracket 226 and is mounted to the upper portion of the end face 240 of upper ramp section 20 in alignment with a longitudinal beam member 242 that forms a portion of the upper frame of upper ramp section 20. Alternatively the brackets 226 and 236 can be integrably formed in the longitudinal beam members 230 and 242.

Turning now to FIGS. 20–22, which depict the lower end of cargo ramp 10, each ground deployment wheel assembly 64 includes a ground wheel 246 that is mounted to a shaft 248. The shaft 248 extends transversely between cylindrical bearing housings 250 that are mounted to spaced apart longitudinal frame members 252 of lower ramp section 18 with one end of the shaft 248 projecting inwardly through the innermost bearing housing 250. The innermost end of shaft 248 is operatively linked to the ouput shaft of a gear reducer 254, which is mounted to a longitudinally extending mounting plate 256, by means of a corrugated drive belt 258 that encompasses pulleys 260 and 262 affixed to the shaft 248 and the output shaft of the gear reducer 254. A similar pulley-corrugated drive belt system 264 interconnects the input shaft of gear reducer 254 to the output shaft of a motor 266 which is mounted to a second longitudinally extending mounting plate 268.

As is most clearly depicted in FIG. 22, each ground wheel 246 includes a hub 270 having outwardly extending flanges 272 for mounting a tire 274. The central portion of hub 270 includes an inwardly projecting annular region 278 that is machined to mate with an axially splined region 280 of the wheel shaft 248. Compression springs 282, positioned between each face of the annular region 276 of the hub 270 and the inner faces of spaced apart collars 284 that are affixed to the shaft 248, bias each ground wheel 246 in a centered position between the bearing housings 250 and permit transverse displacement of a ground wheel 246 whenever necessary. In particular, should a ground wheel 246 encounter a small obstacle during the cargo ramp deployment or retrieval sequence, the ground wheel hub 270 can slide along the splined region 280 of wheel shaft 248 and thereby avoid obstacles which would otherwise impede the inward and outward movement of the cargo ramp 10 or tend to force the cargo ramp 10 into a misaligned position.

As is further illustrated in FIG. 22, the ground wheel tires 274 are preferably solid in construction, being formed of hard rubber, urethane or similar material of limited pliancy. Regardless of the material employed, tires 274 are constructed to exhibit predetermined or controlled deflection characteristics under the compressive forces experienced when heavy vehicles or other large cargo passes over the lower end of cargo ramp 10. For example, in the depicted arrangement, tire 274 is contoured to that the center portion of each tire 274 is spaced away from the surface of hub 270. Further, the outer boundary surface of each tire 274 includes spaced apart semicircular contact regions 286 that not only provide sufficient traction, but permit limited compression when subjected to heavy load forces. This controlled deflection of tires 274 permits the lower terminus of a deployed cargo ramp 10 to be supported by tires 274 during periods when no cargo is being loaded or when the weight or cargo traversing ramp section 18 is less than that required to cause a predetermined deflection of tires 274.

More specifically, each ground deployment wheel assembly 64 includes bearing pads 288 that are mounted to project downwardly from the lower portion of each ground wheel bearing housing 250. Each bearing pad 288 includes a longitudinally extending skid plate 290 which is positioned a predetermined distance above the runway 30 or other similar cargo zone when no downwardly acting load force is applied to ground wheels 246. When extremely heavy loads that should not be supported by the tires 274 pass over ground wheels 246, tires 274 are compressed and the bearing pads 288 support the lower terminus of cargo ramp 10. For example, in one embodiment of the invention, skid plates 290 are normally two inches above the surface of the runway 26 and tires 274 are constructed so that the lower terminus of cargo ramp 10 rests on and is supported by bearing pads 288 only when a compressive load force exceeding 30,000 pounds is exerted on the associated ground deployment wheel 246. Thus, under most cargo handling conditions, the lower end of cargo ramp 10 is free to move within the constraints established by the previously described upper ramp support and deployment assembly 40 and centerline coupling mechanism 66. In this respect, even when extremely heavy cargo is being loaded and unloaded, the lower terminus of cargo ramp 10 is usually supported by the ground bearing pads 288 while the cargo is directly above or nearly above ground deployment wheel assemblies 64. Further, should extremely high inwardly or outwardly acting forces be exerted on the lower portion of cargo ramp 10 during a period in which ground bearing pads 288 support the lower terminus cargo ramp 10, skid pads 290 can slide along the surface of the runway 26.

As depicted in FIGS. 20 and 21, to permit deployment and stowage by a single person, each toe ramp 36 preferably consists of two separate rectangular panels 292 that are mounted alongside one another and pivotably connected to the lower terminus 294 of lower ramp section 18. In the depicted arrangement longitudinally extending, spaced apart plates 296 that form the framework of panels 292 extend outwardly from the upper edge of the toe ramp 36 and are pivotably interconnected with the forward end of hinge plates 297 by means of a hinge rod 298. The aft end of each hinge plate 297 is pivotably connected with the upper surface 28 of lower ramp section 18 by a second hinge rod 299 which passes transversely across the cargo ramp 10 to thereby permit the panels 292 to be swung between the deployed and stowed positions. As illustrated by the phantom lines of FIG. 20, when the panels 292 are swung into the stowed position, a spring-loaded detent 301 that is pivotably attached to lower ramp section 18 encompasses a pin 303 that projects outwardly from the outermost panel 292 to maintain the panels in the stowed position. To structurally link the panels 292 during stowage, the upper surface of the innermost panel 292 includes an outwardly projecting pin 305 that is received by a groove in the upper surface of the outermost panel 292.

To rapidly deploy and retrieve the cargo ramp 10 in the manner described relative to FIGS. 1–4, the hinge actuators 62, motors 114 of deployment wheel assembly 56, motors 158 of deployment adjustment mechanism 52 and motors 266 of ground deployment wheel assemblies 64 are operatively interconnected to form a self-contained deployment and retrieval system. In this respect, in the presently preferred arrangement that is depicted in FIG. 23, hinge actuators 62 and each of the above-mentioned motors are hydraulically operated and are interconnected with a fluid supply line 300 and hydraulic return line 302 of a hydraulic reservoir and pump unit 70. As is indicated in FIG. 23, the deployment wheel drive motor 114 is coupled to the fluid supply line 300 and hydraulic return line 302 of hydraulic reservoir and pump unit 70 by means of an electrically operated value 304. Valve 304 is selectively energized by means of a three-position switch or other conventional apparatus to rotate the deployment wheel assembly 158 in the desired direction and move the cargo ramp inwardly and outwardly as described relative to FIGS. 2 and 3.

As is further illustrated in FIG. 23, the deployment adjustment mechanism motors 158 are commonly connected to the hydraulic supply line 300 and the hydraulic return line 302 via a valve 306 which, like the valve 304, is electrically operable to operate the associated motors in either direction of rotation. Since the deployment adjustment motor 306 are commonly connected to hydraulic reservoir and pump unit 70, the motors operate in unison with one another to simultaneously raise or lower the upper end of cargo ramp 10 whenever there is a substantial change in the vertical distance between the cargo opening 12 and the surface of the cargo loading and unloading zone, i.e., whenever the cargo ramp 10 is utilized with aircraft having retractable nose gear that allows various loading and unloading positions or when the cargo ramp 10 is employed with a waterborne vessel that must load and unload at various facilities.

With continued reference to FIG. 23, hydraulic interconnection of the hinge actuators 62 to hydraulic reservoir and pump unit 70 is similar to the interconnection of deployment adjustment mechanism motors 158 in that the hinge actuators 62 are commonly connected to hydraulic supply line 300 and hydraulic return line 302 via a valve 308 and thus are caused to operate in unison with one another. In addition, flow limiters or check valves 310 are interposed in the common portion of the hydraulic lines that supply fluid to and from the hydraulic actuators 62. The flow limiters 310 prevent fluid flow in a direction opposite to that indicated by the arrows of FIG. 23 to thereby maintain the hinge actuators 62 in their present position should hydraulic failure occur. For example, should the hydraulic reservoir and pump unit 70 fail while the lower end of cargo ramp 10 is being lowered as described previously relative to FIG. 3, the fluid limiters 310 prevent lower ramp section 18 from swinging downwardly under the force of gravity at a rate which could damage the ground wheel assembly 64 as the lower end of the cargo ramp 10 impacts with the surface of runway 30. Additionally, as indicated in FIG. 23, the fluid conduits that direct hydraulic pressure into and out of the hinge actuator 62 include flexible couplings 112 at the interface between lower ramp section 18 and upper ramp section 20.

To operate ground wheels 246 of ground wheel assemblies 64 in unison with one another and provide selective operation in either direction of rotation, the ground wheel motors 266 are commonly interconnected with the hydraulic supply line 300 and the hydraulic return line 302 via a valve 314. As is schematically depicted in FIG. 23, the valve 314 is operatively linked with a two-way valve 316 which is responsive to the hinge actuator valve 308. In particular, valve 316 operates to reduce the hydraulic pressure supplied to ground wheel motors 266 whenever hinge actuators 62 are simultaneously energized so that the ground deployment wheels 246 rotate at a slower rate during portions of the deployment and retrieval sequence in which hinge actuators 62 swing the lower ramp section 18 about the hinges 22. For example, in one embodiment of the invention, ground wheel motors 266 are rotated at a rate which moves the ramp inwardly and outwardly at approximately two feet per second whenever the hinge actuators 62 are not activated and at a rate which moves the ramp at approximately one foot per second whenever the hinge actuators 62 are simultaneously swinging lower ramp section 18 about the hinges 22.

The embodiments of the invention depicted in the drawings and described herein are exemplary in nature and those skilled in the art will recognize that various changes and modifications can be effected without departing from the scope and spirit of this invention. Accordingly, it is intended that the invention should be limited only by the definitions thereof which are presented by the appended claims.

The embodiments of the invention in which an exclusive property or privilege is claimed are defined as follows:

1. A cargo ramp stowable in a first position onboard a cargo carrying vessel and deployable to a second position wherein said cargo ramp extends angularly between the terminus of a cargo deck of said cargo carrying vessel and the surface of a cargo handling zone, said cargo ramp comprising:

first and second ramp sections each having an upper surface, a lower surface, first and second end regions and first and second oppositely disposed side surfaces;

hinge means for pivotably connecting said first end region of said second ramp section to said second end region of said first ramp section;

actuator means for swinging said second ramp section about said hinge means during movement of said cargo ramp between said first and second positions; and upper support and deployment means for supporting said first end region of said first ramp section when said cargo ramp is moved between said first and second positions and retrieved from said second position to said first position and for forming an interface between said cargo ramp and said cargo carrying vessel when said cargo ramp is maintained in said second position, said upper support and deployment means including roller means configured for engagement with guide means mounted on said cargo deck of said vessel to permit said cargo ramp to be moved inwardly and outwardly across said terminus of said cargo deck, said upper support and deployment means further including first and second elongate support arms mounted with said first support arm extending longitudinally outward from said first end region of said first ramp section at a position proximate to said first side surface and with said second support arm extending longitudinally outward from said first end region of said first ramp section at a position proximate to said second side surface, said roller means of said support and deployment means including first and second roller mounted carriages for interconnection with said first and second support arms, said first and second roller mounted carriages and the outer region of said first and second support arms being configured and arranged to form a first ball-and-socket coupling for interconnecting said first support arm with said first roller mounted carriage and for forming a second ball-and-socket coupling for interconnecting said second support arm with said second roller mounted carriage.

2. The cargo ramp of claim 1 wherein each of said first and second roller mounted carriages includes a spherical support partially encompassed and contained by a contoured receptacle formed within the central portion of said first and second roller mounted carriages, each of said first and second support arms including a downwardly extending outer end region including a downwardly facing contoured receptacle for respectively encompassing the upper portion of said spherical supports of said first and second roller mounted carriages.

3. The cargo ramp of claim 2 wherein at least one of said downwardly extending outer end regions of said first and second support arms is a socket fitting that is interconnected with the support arm associated therewith for pivotable movement about an axis substantially parallel to the longitudinal axis of said cargo ramp.

4. The cargo ramp of claims 1, 2 or 3 further comprising ground support wheels mounted to said second end region of said second ramp section for supporting the lower terminus of said cargo ramp on said surface of said cargo handling zone, said ground support wheels being constructed and arranged for vertical deflection when substantial downwardly acting load forces are exerted on said upper surface of said lower ramp section by movement of cargo along said cargo ramp, said cargo ramp further comprising ground bearing pads extending downwardly from said lower surface of said second ramp section, said ground bearing pads being dimensioned and arranged for moving into abutment with said surface of said cargo handling zone and supporting said lower terminus of said ramp whenever said ground support wheels undergo a predetermined vertical deflection.

5. The cargo ramp of claims 1, 2 or 3 further comprising first and second ground deployment wheel assemblies mounted to said second end region of said second ramp section at a position proximate said first and second oppositely disposed side surfaces for supporting the lower terminus of said cargo ramp on said surface of said cargo handling zone, each of said ground deployment wheel assemblies including a shaft mounted transverse to said cargo ramp and a ground support wheel mounted for rotation on said shaft, said ground support wheel and said shaft including means for biasing said ground support wheel at a first location along said shaft and for permitting inward and outward movement from said first location when said ground wheel is subjected to transversely acting forces during movement of said cargo ramp between said first and second positions.

6. The cargo ramp of claims 1, 2 or 3 further comprising deployment adjustment means operable for vertically positioning said first end of said first ramp section relative to said cargo deck of said vessel when said cargo ramp is in said second position.

7. The cargo ramp of claims 2 or 3 wherein said first and second support arms of said support and deployment means are pivotably interconnected with said first ramp section at a position intermediate the outer and inner ends of said support arms for swinging movement of said outer regions of said support arms within a substantially vertical plane, said cargo ramp further comprising deployment adjustment means for swinging said outer regions of said first and second support arms to raise and lower the upper terminus of said cargo ramp relative to said cargo deck, said deployment adjustment means including first and second rotatable threaded rods having first and second nuts respectively engaged therewith, said first nut being affixed to said inner end of said first support arm and said second nut being affixed to said inner end of said second support arm with said first and second threaded rods being mounted for rotation with said first ramp section.

8. The cargo ramp of claims 1, 2 or 3 wherein said cargo ramp further comprises centerline coupling means for further interconnecting said first end region of said first ramp section with said cargo carrying vessel when said cargo ramp is in said second position, said centerline coupling means being mounted within said first ramp section and extending outwardly from said first end region thereof for engagement with a fitting mounted to the terminal region of said cargo deck when said actuator means swings said first and second ramp sections into alignment with one another to place said cargo ramp in said second position.

9. The cargo ramp of claim 8 wherein said fitting of said terminal region of said cargo deck comprises a coupling hook having an upwardly extending member and wherein said centerline coupling means comprises a tension arm extending outwardly through said first end region of said first ramp section and a shaft mounted within said first ramp section and passing through the innermost region of said tension arm to permit pivotable movement of said tension arm through a vertically extending arc, said tension arm including a coupling ring pivotably interconnected with the outermost end of said tension arm for transverse movement relative to the axial centerline of said tension arm, said tension arm and said coupling ring being dimensional and arranged to automatically encompass said upwardly extending member of said coupling hook when said actuator swings said first and second ramp sections into alignment with one another to place said cargo ramp in said second position.

10. The cargo ramp of claims 1, 2 or 3 further comprising motor-driven deployment wheels extending downwardly from said lower surface of said first ramp section and operable to move said cargo ramp across said cargo deck between said first position and a position in which said second ramp section and said hinge means is positioned outwardly of said terminus of said cargo deck and above said surface of said cargo handling zone.

11. The cargo ramp of claims 1, 2 or 3 further comprising at least one guide pin assembly mounted to said first ramp section to project downwardly therefrom, each said guide pin assembly being configured and arranged for slidable engagement in a centerline deployment channel mounted to said cargo deck and extending orthogonally from said terminus of said cargo deck to maintain said cargo ramp in an aligned orientation when said cargo ramp is moved inwardly and outwardly across said cargo deck in moving said cargo ramp between said first and second positions.

12. The cargo ramp of claims 1, 2 or 3 further comprising restraining means for temporarily securing said first end region of said first ramp section to said vessel to prevent inward and outward movement of said first end region of said first ramp section during portions of a deployment and retrieval sequence for moving said cargo ramp between said first and second positions wherein said first end region of said first ramp section is positioned slightly outward of said terminus of said cargo deck and said actuator means is operated to swing said second ramp section about said hinge means.

13. The cargo ramp of claim 12 wherein said restraining means comprises spring-loaded retention pins mounted in each of said first and second roller means, each of said spring-loaded retention means being operable to engage with openings in said cargo deck and operable for disengagement from said openings.

14. A cargo ramp system for use with a cargo vessel having an elevated cargo deck wherein said cargo ramp is stowable in a first position onboard said vessel and deployable to a second position wherein said cargo ramp extends downwardly from a region of said cargo deck configured for the loading and unloading of cargo and the surface of a cargo handling zone, said cargo ramp system comprising:

an upper and lower ramp section having upper and lower end regions, an upper surface, a lower surface and first and second boundary sides;

a hinge assembly pivotably interconnecting said upper end region of said lower ramp section to said lower end region of said upper ramp section;

hinge actuator means for swinging said lower ramp section about said hinge assembly to move said lower ramp section between said first position wherein said upper and lower ramp sections are maintained in substantial axial alignment with one another and a deployment position wherein said lower ramp section extends angularly downward from the lower end of said upper ramp section;

first wheel means mounted to said lower end of said lower ramp section for supporting said cargo ramp on said surface of said cargo handling zone when said cargo ramp is in said second position and during predetermined portions of a deployment and retrieval sequence for moving said cargo ramp between said first and second positions;

support and deployment means mounted to extend axially outward from said upper end region of said upper ramp section for supporting said upper end of said cargo ramp and for facilitating movement of said cargo ramp between said first and second positions, said support and deployment means including carriage means movable along said cargo deck and ball-and-socket interconnection means for structurally linking said carriage means to said upper end region of said upper ramp section; and deployment guide channel means mountable to said cargo deck for receiving and retaining said carriage means in an aligned orientation with said region of said cargo deck arranged for the loading and unloading of cargo to allow said cargo ramp to be moved inwardly and outwardly along said deployment guide channel means.

15. The cargo ramp system of claim 14 wherein said deployment guide channel means comprises first and second channel members having upwardly extending flanges along the longitudinal boundary edges thereof, said first and second channel members being mounted to said cargo deck in parallel spaced apart relationship with one another for receiving first and second ones of said carriage means, each of said first and second carriage means of said support deployment means including a plate having a plurality of openings extending therethrough and a plurality of rollers, each of said rollers being mounted within one of said openings for contacting one of said first and second channel members in the region between said upwardly extending flanges, each of said first and second carriage means further including an upwardly facing receptacle in the central portion of said plate and a spherical support received in said receptacle and extending upwardly therefrom to form a portion of said ball-and-socket interconnection means, said support and deployment means further comprising first and second support arms extending longitudinally outward from said upper end region of said upper ramp section with said first support arm being adjacent said first boundary side of said upper ramp section and said second support arm being adjacent said second boundary side thereof, each of said first and second support arms including a socket fitting at the outward end thereof, each of said socket fittings including a downwardly facing recess for partially encompassing one of said spherical supports and completing said ball-and-socket interconnection means.

16. The cargo ramp system of claim 15 wherein at least one of said socket fittings of said support arms is pivotably interconnected with its associated support arm for limited swinging movement of said support arm about an axis substantially parallel to the longitudinal axis of said cargo ramp.

17. The cargo ramp system of claims 14, 15 or 16 further comprising deployment adjustment means interconnected with said support and deployment means for vertical adjustment of said upper end region of said upper ramp section when said cargo ramp is in said second position.

18. The cargo ramp system of claim 17 wherein said first wheel means includes first and second ground support wheels mounted to extend downwardly from said lower end region of said lower ramp section at a position adjacent said first and second side boundaries, each of said ground support wheels being constructed for limited compression as cargo is moved across said lower ramp section, said lower ramp section further including ground support pads extending downwardly therefrom at a position near each of said ground support wheels, said ground support pads being spaced apart from said surface of said cargo handling zone when cargo exceeding a predetermined weight is not present on said cargo ramp and being forced into abutment with said surface of said cargo handling zone when cargo exceeding said predetermined weight passes across said lower ramp section.

19. The cargo ramp system of claim 18 further comprising second wheel means mounted to extend downwardly from said lower surface of said upper ramp section for contacting the surface of said cargo deck when said cargo ramp is in said first position and when said cargo ramp is moved inwardly and outwardly across said cargo deck to place said cargo ramp in said first and second positions, said second wheel means including a motor operable to drive said cargo ramp inwardly and outwardly across said cargo deck.

20. The cargo ramp system of claim 19 wherein said first wheel means includes a motor selectively operable to move the lower end of said cargo ramp inwardly and outwardly relative to said vessel when said lower end region of said lower ramp section is supported by said first wheel means.

21. The cargo ramp system of claim 20 wherein said deployment adjustment means includes a motor selectively operable for raising and lowering said upper end region of said upper ramp section when said cargo ramp is in said second position.

22. The cargo ramp system of claim 21 further comprising control system means for selectively operating said hinge actuator means, said motor of said first wheel means, said motor of said second wheel means, and said motor of said deployment adjustment means.

23. The cargo ramp system of claim 22 further comprising center guide pin means mounted to extend downwardly from spaced apart locations along said lower surface of said upper ramp section and a centerline guide channel mounted on said cargo deck for receiving said centerline guide pin means, said centerline guide pin means being engaged with said centerline guide channel when said cargo ramp is moved inwardly and outwardly across said cargo deck to maintain said cargo ramp in an aligned orientation.

24. The cargo ramp system of claim 14 wherein said support and deployment means includes first and second support arms extending outwardly through said upper end region of said upper ramp section with said first and second support arms being respectively adjacent said first and second boundary walls of said upper ramp section and being pivotably connected to said upper ramp section at a point intermediate the inner and outer terminations of said support arms to permit swinging movement of said outer terminations of said support arms in substantially vertical planes, said cargo ramp system further comprising deployment adjustment means for displacing said inner terminations of said first and second support arms and moving said outer terminations in said vertical planes to vertically position said upper end region of said upper ramp section when said cargo ramp is in said second position.

25. The cargo ramp system of claim 24 further comprising centerline coupling means extending outwardly from the central portion of said upper end region of said upper ramp section, said centerline coupling means including means for permitting limited vertical and transverse displacement of the outer terminus thereof, said cargo ramp system further comprising means mounted to said vessel for engaging said outer terminus of said centerline coupling mechanism when said cargo ramp is moved between said second position and a position in which said upper cargo ramp section extends outwardly from said vessel with said upper end region of said upper ramp section being spaced slightly outwardly from said region of said cargo deck configured for the loading and unloading of cargo and said second cargo ramp extends angularly downward to said surface of said cargo handling zone through activation of said hinge actuator means.

26. The cargo ramp system of claim 25 wherein said deployment guide channel means comprises first and second channel members having upwardly extending flanges along the longitudinal boundary edges thereof, said first and second channel members being mounted to said cargo deck in parallel spaced apart relationship with one another for receiving first and second ones of said carriage means, each of said first and second carriage means of said support and deployment means including a plate having a plurality of openings extending therethrough and a plurality of rollers, each of said rollers being mounted within one of said openings for contacting one of said first and second channel members in the region between said upwardly extending flanges, each of said first and second carriage means further including an upwardly facing receptacle in the central portion of said plate and a spherical support received in said receptacle and extending upwardly therefrom to form a portion of said ball-and-socket interconnection means, said support and deployment means further comprising first and second support arms extending longitudinally outward from said upper end region of said upper ramp section with said first support arm being adjacent said first boundary side of said upper ramp section and said second support arm being adjacent said second boundary side thereof, each of said first and second support arms including a socket fitting at the outward end thereof, each of said socket fittings including a downwardly facing recess for partially encompassing one of said spherical supports and completing said ball-and-socket interconnection means.

27. The cargo ramp system of claim 26 wherein the terminal portion of said first and second channel members adjacent said region of said cargo deck configured for the loading and unloading of cargo is dimensioned and arranged to prevent said rollers from contacting said channel members and cause frictional contact between said carriage plates and said channel members to facilitate cessation of outward movement of said cargo ramp when said end region of said upper cargo ramp reaches said region of said cargo ramp configured for loading and unloading of cargo.

28. The cargo ramp system of claim 27 wherein said carriage means further include spring-loaded retention pins operable to project downwardly below said plates and said terminal region of said first and second channel members further include openings for receiving said retention pins when said upper end region of said upper ramp section is positioned slightly outwardly of said cargo deck and said hinge actuators are being operated to swing said cargo ramp into and out of said second position.

29. A cargo ramp stowable in a first postion aboard a cargo carrying vessel and deployable to a second position wherein said cargo ramp extends angularly between the terminus of a cargo deck of said cargo carrying vessel and the surface of a cargo handling zone, said cargo ramp comprising:
first and second ramp sections each having an upper surface, a lower surface, first and second end regions and first and second oppositely disposed side surfaces;
hinge means for pivotably connecting said first end region of said second ramp section to said second end region of said first ramp section;
actuator means for swinging said second ramp section about said hinge means during movement of said cargo ramp between said first and second positions;
upper support and deployment means for supporting said first end region of said first ramp section when said cargo ramp is moved between said first and second positions and retrieved from said second position to said first position and for forming an interface between said cargo ramp and said cargo carrying vessel when said cargo ramp is maintained in said second position, said upper support and deployment means including roller means configured for engagement with guide means mounted on said cargo deck of said vessel to permit said cargo ramp to be moved inwardly and outwardly across said terminus of said cargo deck, said upper support and deployment means further including limited displacement means interconnecting said roller means to said first end region of said first cargo ramp section for allowing limited movement of said first end region of said first ramp section relative to said roller means;
ground support wheels mounted to said second end region of said second ramp section for supporting the lower terminus of said cargo ramp on said surface of said cargo handling zone, said ground support wheels being constructed and arranged for vertical deflection when substantial downwardly acting load forces are exerted on said upper surface of said lower ramp section by movement of cargo along said cargo ramp; and
ground bearing pads extending downwardly from said lower surface of said second ramp section, said ground bearing pads being dimensioned and arranged for moving into abutment with said surface of said cargo handling zone and supporting said lower terminus of said ramp whenever said ground support wheels undergo a predetermined vertical deflection.

30. A cargo ramp stowable in a first position aboard a cargo carrying vessel and deployable to a second position wherein said cargo ramp extends angularly between the terminus of a cargo deck of said cargo carrying vessel and the surface of a cargo handling zone, said cargo ramp comprising:
first and second ramp sections each having an upper surface, a lower surface, first and second end regions and first and second oppositely disposed side surfaces;
hinge means for pivotably connecting said first end region of said second ramp section to said second end region of said first ramp section;
actuator means for swinging said second ramp section about said hinge means during movement of said cargo ramp between said first and second positions;
upper support and deployment means for supporting said first end region of said first ramp section when said cargo ramp is moved between said first and second positions and retrieved from said second position to said first position and for forming an interface between said cargo ramp and said cargo carrying vessel when said cargo ramp is maintained in said second position, said upper support and deployment means including roller means configured for engagement with guide means mounted on said cargo deck of said vessel to permit said cargo ramp to be moved inwardly and outwardly across said terminus of said cargo deck, said upper support and deployment means further including limited displacement means interconnecting said roller means to said first end region of said first cargo ramp section for allowing limited movement of said first end region of said first ramp section relative to said roller means; and
first and second ground deployment wheel assemblies mounted to said second end region of said second ramp section at a position proximate to said first and second oppositely disposed side surfaces for supporting the lower terminus of said cargo ramp on said surface of said cargo handling zone, each of said ground deployment wheel assemblies including a shaft mounted transverse to said cargo ramp and a ground support wheel mounted for rotation on said shaft, said ground support wheel and said shaft including means for biasing said ground support wheel at a first location along said shaft and for permitting inward and outward movement from said first location when said ground wheel is subjected to transversely acting forces during movement of said cargo ramp between said first and second positions.

31. A cargo ramp stowable in a first position aboard a cargo carrying vessel and deployable to a second position wherein said cargo ramp extends angularly between the terminus of a cargo deck of said cargo carrying vessel and the surface of a cargo handling zone, said cargo ramp comprising:

first and second ramp sections each having an upper surface, a lower surface, first and second end regions and first and second oppositely disposed side surfaces;

hinge means for pivotably connecting said first end region of said second ramp section to said second end region of said first ramp section;

actuator means for swinging said second ramp section about said hinge means during movement of said cargo ramp between said first and second positions;

upper support and deployment means for supporting said first end region of said first ramp section when said cargo ramp is moved between said first and second positions and retrieved from said second position to said first position and for forming an interface between said cargo ramp and said cargo carrying vessel when said cargo ramp is maintained in said second position, said upper support and deployment means including roller means configured for engagement with guide means mounted on said cargo deck of said vessel to permit said cargo ramp to be moved inwardly and outwardly across said terminus of said cargo deck, said upper support and deployment means further including limited displacement means interconnecting said roller means to said first end region of said first cargo ramp section for allowing limited movement of said first end region of said first ramp section relative to said roller means; and at least one guide pin assembly mounted to said first ramp section to project downwardly therefrom, each said guide pin assembly being configured and arranged for slidable engagement in a centerline deployment channel mounted to said cargo deck and extending orthogonally from said terminus of said cargo deck to maintain said cargo ramp in an aligned orientation when said cargo ramp is moved inwardly and outwardly across said cargo deck in moving said cargo ramp between said first and second positions.

* * * * *